United States Patent

Chu et al.

[11] Patent Number: 5,831,362
[45] Date of Patent: Nov. 3, 1998

[54] MAGNET-SUPERCONDUCTOR FLYWHEEL AND LEVITATION SYSTEMS

[75] Inventors: Wei-Kan Chu, Pearland; Quark Yung-Sung Chen, Houston; Ki-Bui Ma, Jersey Village; Harold Zule Xia, Houston; Mark Alan Lamb, Houston; Rodger Sheldon Cooley, Houston; Chase Kenyon McMichael, Houston, all of Tex.

[73] Assignee: The University of Houston, Houston, Tex.

[21] Appl. No.: 895,387

[22] Filed: Jul. 16, 1997

Related U.S. Application Data

[63] Continuation of Ser. No. 333,034, Nov. 1, 1994, abandoned.

[51] Int. Cl.$^6$ .................................................. H02K 7/09
[52] U.S. Cl. ............................ 310/90.5; 310/90; 505/166; 74/572; 74/573 R
[58] Field of Search .................... 310/90, 90.5; 505/166; 74/572, 573 R

[56] References Cited

U.S. PATENT DOCUMENTS

| | | | |
|---|---|---|---|
| 3,942,053 | 3/1976 | Abolins et al. | 310/52 |
| 4,060,743 | 11/1977 | Weghaupt | 310/52 |
| 4,843,504 | 6/1989 | Barnes | 360/106 |
| 4,919,523 | 4/1990 | Burr | 350/567 |
| 4,926,082 | 5/1990 | Barnes | 310/90.5 |
| 4,939,120 | 7/1990 | Moon et al. | 505/1 |
| 4,956,571 | 9/1990 | Gordon et al. | 310/90.5 |
| 4,961,352 | 10/1990 | Downer et al. | 74/5.46 |
| 5,011,820 | 4/1991 | Ehrhart et al. | 505/1 |
| 5,117,139 | 5/1992 | Flom et al. | 310/90.5 |
| 5,126,317 | 6/1992 | Agarwala | 505/1 |
| 5,126,661 | 6/1992 | Harvey et al. | 324/158 R |
| 5,130,588 | 7/1992 | Armstrong et al. | 310/90.5 |
| 5,159,219 | 10/1992 | Chu et al. | 310/90.5 |
| 5,160,911 | 11/1992 | Herring | 335/216 |
| 5,177,387 | 1/1993 | McMichael et al. | 310/90.5 |
| 5,196,748 | 3/1993 | Rigney | 310/90.5 |
| 5,204,568 | 4/1993 | Kleinberg et al. | 310/90.5 |
| 5,214,981 | 6/1993 | Weinberger et al. | 74/573 R |
| 5,216,889 | 6/1993 | Herd et al. | 62/51.1 |
| 5,220,232 | 6/1993 | Rigney, II et al. | 310/90.5 |
| 5,222,366 | 6/1993 | Herd et al. | 62/51.1 |
| 5,256,638 | 10/1993 | Weinberger et al. | 505/1 |
| 5,270,601 | 12/1993 | Rigney, II | 310/90.5 |
| 5,283,234 | 2/1994 | Wang et al. | 505/1 |
| 5,314,868 | 5/1994 | Takahata et al. | 505/166 |
| 5,395,820 | 3/1995 | Murakami et al. | 505/126 |
| 5,436,516 | 7/1995 | Yamazaki et al. | 310/90.5 |
| 5,495,221 | 2/1996 | Post | 335/299 |
| 5,540,116 | 7/1996 | Hull et al. | 74/572 |

*Primary Examiner*—Steven L. Stephan
*Assistant Examiner*—Elvin G. Enad
*Attorney, Agent, or Firm*—J. M. (Mark) Gilbreth; Robert W. Strozier; Gilbreth & Strozier

[57] ABSTRACT

Disclosed is a flywheel system for storing kinetic energy which utilizes a high temperature superconductor/magnet system for the flywheel bearings. The flywheel includes a first magnet, and having a ring magnet defining an opening. The levitation system includes a magnet for attractively interacting with first flywheel magnet, with a high temperature superconductor interposed between them, and further includes a magnet system for repulsively interacting with and partially inserted into the ring magnet.

11 Claims, 21 Drawing Sheets

A-A Section

MAGNET-SUPERCONDUCTOR FLYWHEEL AND LEVITATION SYSTEMS

This is a continuation of application Ser. No. 08/333,034 filed on Nov. 1, 1994 now abandoned.

BACKGROUND OF THE INVENTION

1. Field of the Invention

The present invention relates to magnet-superconductor systems, and to bearings and other articles utilizing magnet-superconductor interactions. In another aspect, the present invention relates to magnet-superconductor flywheel systems for storing energy. In even another aspect, the present invention relates to magnet-superconductor rotational systems for equipment.

2. Description of the Related Art

Flywheels have been well-known as one of the oldest ancient mechanical designs in human history. Historically, the first flywheel dates back to 3000 BC, when the flywheel was recognized as the potter s wheel. Essentially being a mechanical battery, flywheel energy storage (FES) system, many believe, could be one of the most efficient means to solve two critical problems faced by modern society: the rapid increase in the use of energy and the consequent impact of energy consumption on the environment.

Of particular concern to a flywheel energy storage device is its overall efficiency, which is dictated by four major factors: (1) motor/generator conversion efficiency; (2) power conditioning system efficiency; (3) windage drag; and (4) flywheel bearing efficiency.

Recent developments in new materials and magnetic bearings using electromagnetic levitation resurrect the interests of scientists and engineers in advancing the flywheel technology for energy storage applications.

Conventional mechanical bearings used in conjunction with high rotational speed devices are subject to metal wear, noise, vibration and friction heating problems. These problems can often lead to seizure or other failure of the bearing. In addition, mechanical bearings often require lubricants which fail in severe environments such as those commonly encountered in outer space. Failure of conventional liquid lubricants in outer space is usually due to the vacuum conditions that cause the lubricants to outgas, leaving bearing surfaces dry and resulting in the ultimate failure of the bearings. Additionally, in outer space, temperatures are very low so most lubricants solidify and simply do not function as lubricants.

As a result of these and other shortcomings, there has been considerable emphasis on the developments of alternatives to mechanical bearings. For example, work has been done to develop more efficient air bearings, as well as magnetically suspended bearings.

One problem with air bearings is that they require a complete pneumatic system, including pumps, valves, seals, and conduits, for their operation. Another shortcoming of air bearings is that they result in a continuous energy loss. For example, a high speed cryocooler system in outer space applications, would suffer a 10–20 watt energy loss due to bearing friction losses. Even in non-space applications, use of an air system adds significant cost, size, and weight to the bearing package and introduces various reliability problems normally associated with pneumatic system components.

Because of the fine tolerances required, which are on the order of one ten-thousandth of an inch, air bearings themselves are difficult to manufacture, and thus expensive.

Furthermore, air bearings are highly vulnerable to contaminants. A particle of dust as small as four ten-thousandths of an inch can interfere with air gaps and clog pores of graphite or other diffusive coatings.

One obvious approach toward reducing friction losses from two relatively moving surfaces is to exert supporting force without physical contacts. Thus, magnetically suspended bearings have been developed as an alternative to air bearings.

While active magnetic bearing systems are now a well-developed and widely accepted technology, no intrinsic stability exists for a magnetized body under the influence of an external magnetic field. This phenomenon is known as Earnshaw s theorem and occurs in any potential satisfying the Laplace equation, which includes electric, magnetic, and gravitational potentials.

Thus, in an active magnetic bearing, feedback control is applied to an electromagnet or combinations of permanent magnets and electromagnets to accomplish dynamic stability.

Because permanent magnet magnetic field strength is generally limited, the use of permanent magnets is limited to applications where very small forces are adequate. Electromagnets can supply considerably more magnetic force than comparable permanent magnets, and their magnetic fields can be altered by use of feedback control systems, and are thus generally preferred.

Unfortunately, the required feedback control systems with the attendant complex sensor and actuator electronics, add considerably to the cost, size, and operational complexity of an active magnetic bearing system.

It has been appreciated for years that magnetic fields strongly interact with superconducting materials. For example, stable levitation of a superconductor in an external magnetic field has long been demonstrated. Levitation of low temperature superconductors (LTS) by a charged superconducting coil and permanent magnet levitated above a bowl-shaped LTS are some classic demonstrations of superconductivity. Such systems are technically considered passive bearings, since there is no explicit use of feedback control. However, such systems are effectively active, that is active per se, since the intrinsic opposite magnetization constantly induced is fulfilling the same function of maintaining a dynamically stable levitation as a feedback control system.

The most distinctive property of a superconductive material is its loss of electrical resistance when it is at or below a critical temperature. This critical temperature is an intrinsic property of the material and is referred to as the superconducting transition temperature of the material, $T_c$.

Recent research activities have brought the discovery of high temperature superconducting (HTS) compounds. HTS compounds are those which superconduct at and below a critical temperature, $T_c$, which is above the boiling point temperature of nitrogen.

Following the discovery of superconductivity in a rare earth-alkaline earth-Cu oxide system of a perovskite crystalline structure, a new class of rare earth-alkaline earth-copper oxides was discovered which are superconductive at temperatures above the boiling point of liquid nitrogen, 77° K. These new rare earth-alkaline earth-copper oxides are now commonly referred to as 123 high-temperature superconductors in reference to the stoichiometry in which the rare earth, alkaline earth, and copper metal atoms are present, namely a ratio of 1:2:3.

Since they are superconductive at temperatures greater than 77° K, the new CuO high temperature superconductors may be cooled with liquid nitrogen, which is a far less costly refrigerant than helium. As a result, the rather complex thermal insulation and helium-recycling systems, necessary to avoid wasting the expensive helium coolant required for the low temperature superconducting material previously known, are no longer necessary. The HTS compounds simplify and enhance the reliability of commercial applications of superconductors. Liquid nitrogen is about 2000 times more efficient to use in terms of cost, when both the refrigerant itself and the associated refrigerant unit design are considered.

Magnetic fields are disclosed for bearings in U.S. Pat. No. 3,810,683. Use of superconductors for support bearings are taught in U.S. Pat. No. 3,378,315, wherein superconducting material is used for a spindle bearing with either permanent magnets or electromagnets providing the supporting magnetic field. U.S. Pat. No. 3,026,151 shows superconducting bearings with the actuator coils likewise formed of superconducting materials.

The recent advances in superconducting materials and the parallel advancements in the field of permanent magnets have made it possible to economically and efficiently couple a superconducting member with a magnetic member to produce highly efficient and relatively inexpensive bearings.

Superconductive materials are of two basic types, designated as Type I and Type II. Efforts have been made in the past to improve magnetic bearing technology by maintaining either the bearing member or the rotating member, or both, in a Type I superconducting state to achieve sufficient magnetic pressure to provide the desired degree of levitation. Unlike Type II superconductors, Type I superconductors are incapable of effecting suspension.

Type I superconductors feature perfect diamagnetism up to a critical applied field, at which point superconductivity is lost and the magnetization of the sample vanishes abruptly. Examples of superconducting bearings of Type I materials can be found in U.S. Pat. Nos. 3,493,274 and 3,026,151. In order to achieve stability in these systems, the bearing structures must rely on either a mechanical rotary support, or must employ superconductors shaped to provide a laterally stable configuration.

The recent discoveries of high temperature superconductors involve Type II materials. Whereas a Type I superconductor completely blocks out magnetic flux from its interior, a phenomenon known as diamagnetism, Type II superconductors allow a certain amount of magnetic flux to penetrate into the interior of the material, producing a suspension effect in addition to a levitation effect. Under such conditions, circulating superconducting currents are established within the superconductor.

A typical example of a system featuring a combination of Type II superconductors and permanent magnets is disclosed in U.S. Pat. No. 4,886,778, which discloses a rotating shaft having two ends, each of which contains a permanent magnet and rotates in a socket clad with superconducting material. The shaft is made to levitate above the sockets by the repulsive forces which exist between the magnets and the superconductors. The incorporation of superconductors into the bearing design offers the possibility of rendering the bearings entirely passive. The design disclosed in U.S. Pat. No. 4,886,778 has the potential for achieving very high rotational speeds, in excess of ten thousand rpm. The interaction between the rotating magnetic axial element and its stationary superconducting support takes place across a gap permeated by a strong magnetic field emanating from permanent magnets embedded in the rotating element.

However, it is desirable to increase the amount of thrust between the superconductor and the magnets with a corresponding increase in the stability. An increased amount of thrust could easily be obtained by utilizing repulsing pairs of magnets in addition. Increased thrust is obtained by increasing the magnetic field on one or both of the magnets, either by utilizing stronger permanent magnets, or increasing the current to an electromagnet. However, as the thrust is increased between repulsing pairs of magnets, the instability of those magnets in the plane normal to the magnet—magnet repulsion axis increases.

U.S. Pat. No. 4,879,537 discloses the use of a superconductor located in the magnet—magnet attraction axis between two attracting magnets. For attracting magnets the instability is along the magnet—magnet attraction axis. However, this system suffers because it is not always desirable to stabilize two attracting magnets by placing a superconductor in the magnet—magnet attraction axis between magnets.

U.S. Pat. No. 5,159,219 discloses the use of high temperature superconductors in close proximity with permanent magnets to make essentially frictionless bearings. Two short comings of the disclosed arrangement are low thrust and low stiffness.

U.S. Pat. No. 5,177,387 discloses the use of an additional magnet to supplement the thrust in a magnet/superconductor system. Since this additional magnet provides the necessary thrust, the high temperature superconductor is left to provide stability. Unfortunately, this arrangement introduces instability from the magnets.

However, the prior art does not disclose a practical design for a flywheel system that is capable of storing kinetic energy.

Thus, there is a need in the art for a practical design for a flywheel system that is capable of storing kinetic energy.

These and other needs in the art will become apparent to those of skill in the art upon review of this specification, including its claims and drawings.

SUMMARY OF THE INVENTION

It is one object of the present invention to provide a practical design for a flywheel system that is capable of storing kinetic energy.

These and other objects of the present invention will become apparent to those of skill in the art upon review of this specification, including its claims and drawings.

According to one embodiment of the present invention there is provided a flywheel system. The flywheel system includes a rotatable flywheel on a shaft, with a magnet on one end of the shaft, and having a ring magnet on the other end of the shaft. The ring magnet is donut-shaped and has an opening. The flywheel system further includes a levitation system for levitating the flywheel. This levitation system comprising a first levitation magnet for attractively interacting with first flywheel magnet, with a high temperature superconductor interposed between the first levitation magnet and the first flywheel magnet. The levitation system also includes a magnet system for repulsively interacting with the ring magnet. This magnet system has a base magnet, a second magnet, and a high temperature superconductor, with the base magnet and the second magnet repulsively interacting, and with the superconductor interposed between the base magnet and the second magnet. The second magnet is adapted for insertion into and is positioned with the ring magnet opening for repulsively interacting with the ring magnet.

According to another embodiment of the present invention there is provided a rotational platform system for rotating mounted equipment such as a telescope, radar, or any other type of equipment. The rotational platform system includes an elongated hollow rotatable member having a mounting platform, a first ring magnet and a second ring magnet. The rotational platform system also includes a levitation system for levitating the hollow rotatable member around a support. On the support are a first pair of repulsed magnets supported on the magnet support and positioned so that the first ring magnet is magnetically between the pair and urging the rotatable member upward. Also on the support are a second pair of repulsed magnets supported on the magnet support and positioned so that the second ring magnet is magnetically between the pair and urging the rotatable member downward. To stabilize the system, a high temperature superconductor is located above the first ring magnet, with a second high temperature superconductor located below the second ring magnet.

DETAILED DESCRIPTION OF THE INVENTION

The present invention provides for magnetic systems which have zero diagonal stiffness with respect to translational and rotational degrees of freedom, yet which are capable of producing a high thrust.

The invention will now first be described by reference to FIG. 1 which shows magnets in an axial arrangement, and FIG. 2(a), FIG. 2(b) and FIG. 2(c) which show magnets in a radial arrangement.

Figure 1:
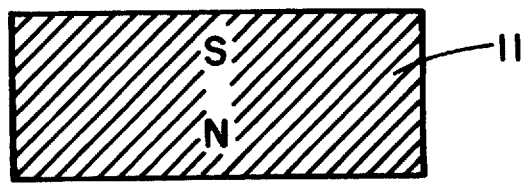
FIG. 1 is a schematic of an axial gap design for magnets 11 and 12 which may be parts of a stator, and magnet 16 which may be part of a rotor.
Figure 1:
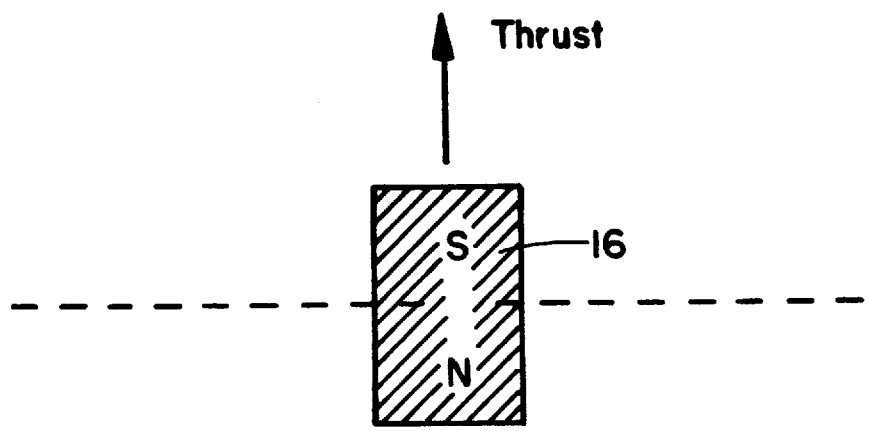
Figure 1:
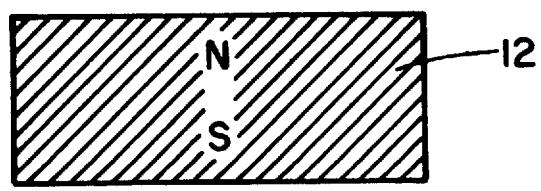

Referring now to FIG. 1 there is shown an axial gap design in which magnets 11 and 12 may be parts of a stator, and magnet 16 which may be part of a rotor. As shown, the rotor and stator magnet subsystems have opposite polarity and form a system having zero diagonal stiffness.

Figure 2A:
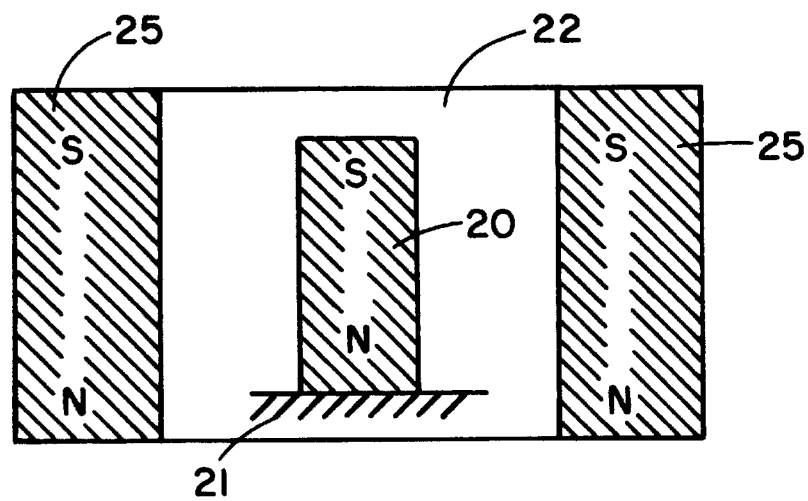
FIGS. 2(a), 2(b) and 2(c), illustrate a radial gap design core magnet 20 affixed to anchor 21, and donut-shaped ring magnet 25 having center hole 22, with core magnet positioned a various positions along the axial axis of core magnet 20, such as fully inside ring magnet 25 in FIG. 2(a), partially inside ring magnet 25 in FIG. 2(b), and completely outside of ring magnet 25 in FIG. 2(c).
Figure 2B:
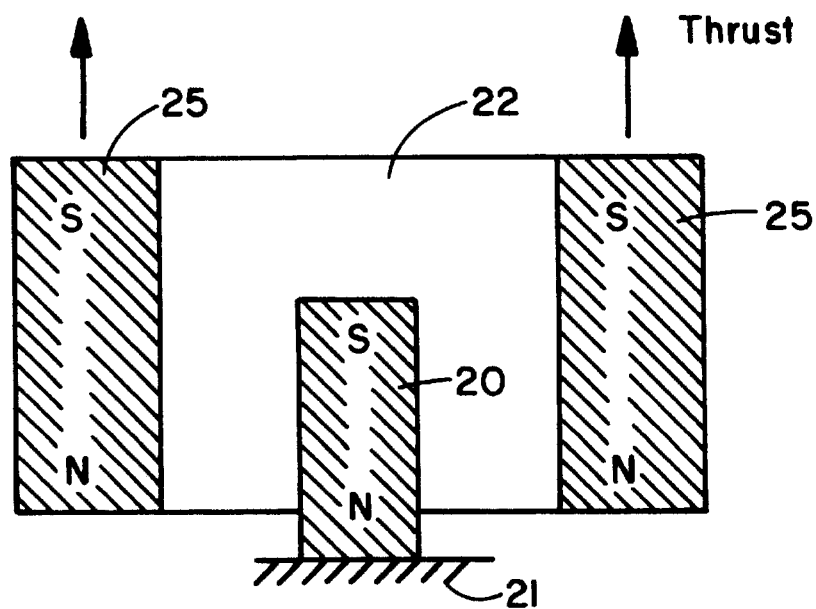
Figure 2C:
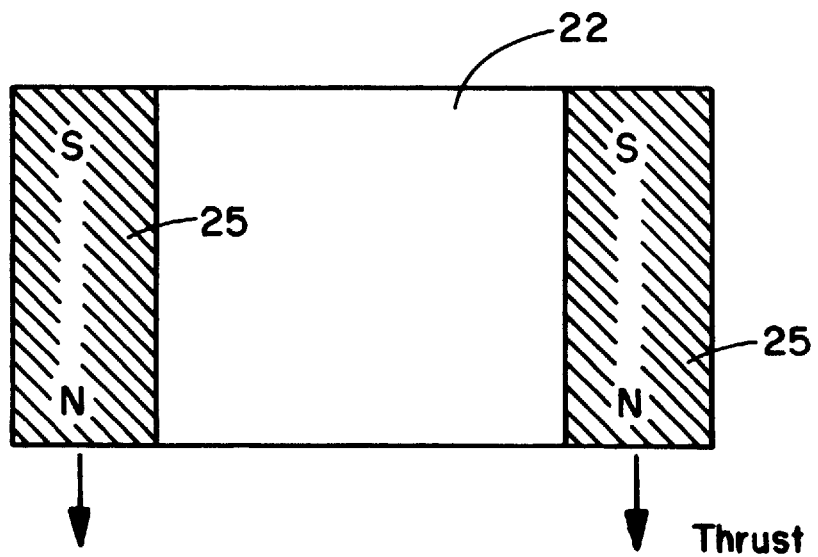
Figure 2C:
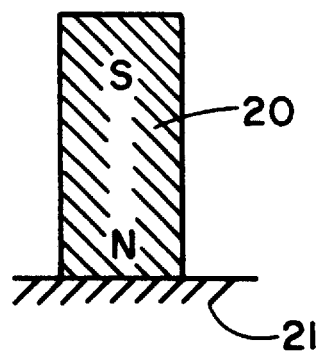

Referring now to FIGS. 2(a), 2(b) and 2(c), there is shown a radial gap design. In FIG. 2(a), core magnet 20 is affixed to anchor 21, and is surrounded by donut-shaped ring magnet 25 having center hole 22. As shown in FIG. 2(a), core magnet 20 and ring magnet 25 will be expelled apart with the slightest relative displacement of magnets 20 and 25. When the core magnet 20 is positioned away from ring magnet 25 along the cylindrical axis of ring magnet 25, core magnet 20 and ring magnet 25 are actually attracted to each other. Somewhere in between the magnet positions as shown in FIG. 2(a) and FIG. 2(c), such as that shown in FIG. 2(b), the magnetic system of the core magnet 20 and the ring magnet 25 are in a state of zero diagonal stiffness. The thrust provided by the magnet system is equal to the weight of the member carrying ring magnets 25.

Axial gap designs as shown in FIG. 1, can generally sustain a greater load than radial gap designs as shown in FIGS. 2(a)–2(c). However, axial gap designs are extremely difficult to utilize in practice, because there is only a very narrow margin in the positioning of the rotor magnet along the rotation axis in which the overall magnetic system is not violently unstable, beyond the capabilities of passive control from reasonable amounts of high temperature superconductors. In contrast, radial gap designs may be able to support only a more moderate load, but are much more forgiving in their tolerance in the axial position of the rotor magnet to attain zero diagonal stiffness.

In the practice of the present invention, it is possible to mix both axial gap and radial gap features in one design to achieve a suitable magnet system.

Figure 3:
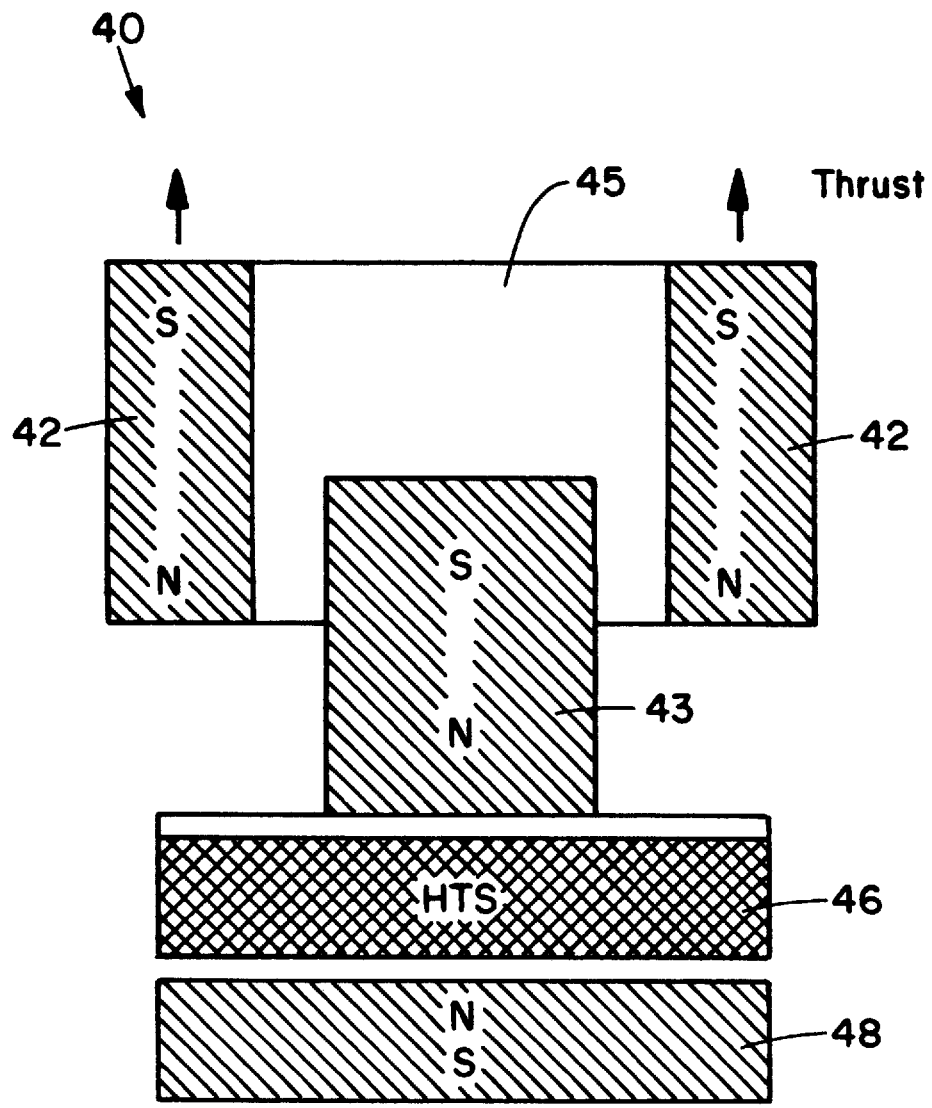
FIG. 3 is a schematic showing magnetic system 40 which includes radial gap features provided by ring-shaped magnet 42 defining hole 45, with cylindrical-shaped magnet 43 positioned within hole 45 surrounded by magnet 42, which includes axial gap features provided by magnet 48 acting upon magnet 42, and which includes HTS member 46 provided to improve the stability of the system.

For those rotating objects whose dimensions perpendicular to the rotation axis are greater than dimensions along the rotational axis, for example disc shaped, the design as shown in FIG. 3 would be utilized. As shown in FIG. 3, magnetic system 40 includes radial gap features provided by ring-shaped magnet 42 defining hole 45, with cylindrical-shaped magnet 43 positioned within hole 45 surrounded by magnet 42. Axial gap features are provided by magnet 48 acting upon magnet 42. HTS member 46 is provided to improve the stability of the system.

It is to be understood that HTS materials could be provided for stability in any number of positions within and/or around magnet system 40, including between any two magnet members and/or beside any magnet members. For example, in additional to HTS material 46 as shown, an HTS sheath could be provided around magnet 43, or an HTS lining could be provided for the interior of ring magnet 42 within hole 45.

As an external field change is forced to propagate into an HTS sample, there will be a spatial region in which the flux remains unaffected by the varying field. The outermost affected region contains the induced current which circulates in a direction that opposes the change of field. Such resistance to field changes stabilizes magnet—magnet interactions, as manifested in stiffness, defined as the negative derivative of force with respect to displacement (or $k_{ij} = -\delta F_j/\delta x_i$); positive stiffness implies stability while negative stiffness reflects instability.

Positive stiffness in the axial direction is accompanied by a negative stiffness in the radial direction—a consequence connoted in Earnshaw s theorem as noted above. An optimal magnet configuration delivers high thrust but exhibits low stiffness. As it will be very unstable on one axis if the orthogonal axis is very stiff, low stiffness is a compromise between stability and instability along orthogonal directions. The rule of thumb is to reduce the negative stiffness to a level which can be overcome by the positive stiffness of the HTS and hence result in a positive net stiffness (stable levitation). There are two primary ways to implement an HTS bearing based on the cooling procedure applied to the HTS, i.e., field cooling and zero-field-cooling.

One is to use permanent magnets brought against a zero-field-cooled (ZFC) HTS to achieve the thrust. In this scenario, due to the flux density gradient within the sample, flux lines may tend to force themselves into the sample, causing energy dissipation and reduction in $J_c$. Force drifts would then follow. Meanwhile, cooling the HTS in zero field requires the magnets to be separated from the HTS before the cooling, adding to the complexity of mechanical design.

The other approach is to use attractive or repulsive forces from permanent magnets to achieve suspension or levitation, and flux-pinning forces from the field-cooled HTS, placed in between the interacting magnets, to acquire stabilization. As the HTS material is cooled below $T_c$, the flux lines of the external field will be frozen inside the material and any subsequent change of the external field would be resisted by the HTS. Such system is less susceptible to flux creep because the differences between the external and internal fields are smaller. However, the HTS now would face an unstable system consisted of magnet pairs tending to either slip away or to crash into each other. Fortunately, with the newly developed large-grain HTS, suppressing such instability has become more manageable. Axial stiffness as high as 20 N/mm has been measured on 1.5-diameter×0.75 thick seeded-grown samples interacting with permanent magnets of similar dimensions. The hybrid superconducting magnetic bearing does not come without a shortcoming. Its relatively lower stiffness makes the tolerance towards temporal instability much narrower than that allowable for an active counterpart.

In application, magnet system 40 could be used to rotate a disc-shaped member around an axis, by making ring magnet 42 part of the disc-shaped member, with magnet 43 part of the shaft member.

Figure 4A:
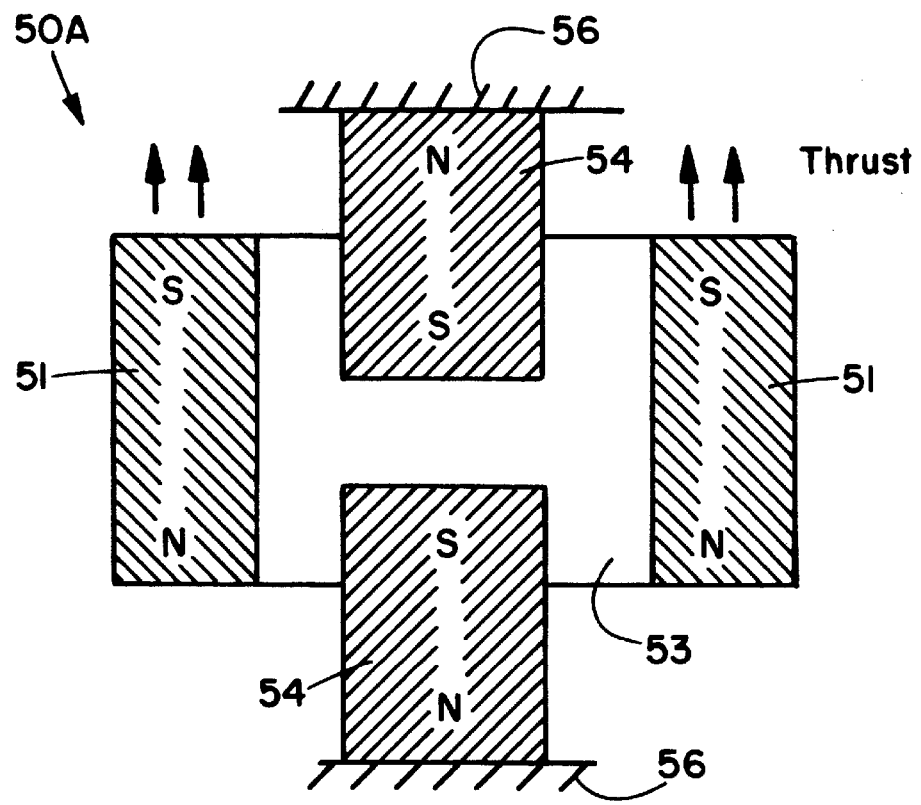
FIG. 4(a) shows magnetic system 50A, including radial gap features provided by ring magnet 51 defining hole 53, including cylindrical magnets 54 positioned partially within hole 53 and partially surrounded by ring magnet 51 as shown, to provide zero diagonal stiffness, and including anchor 56.
Figure 4B:
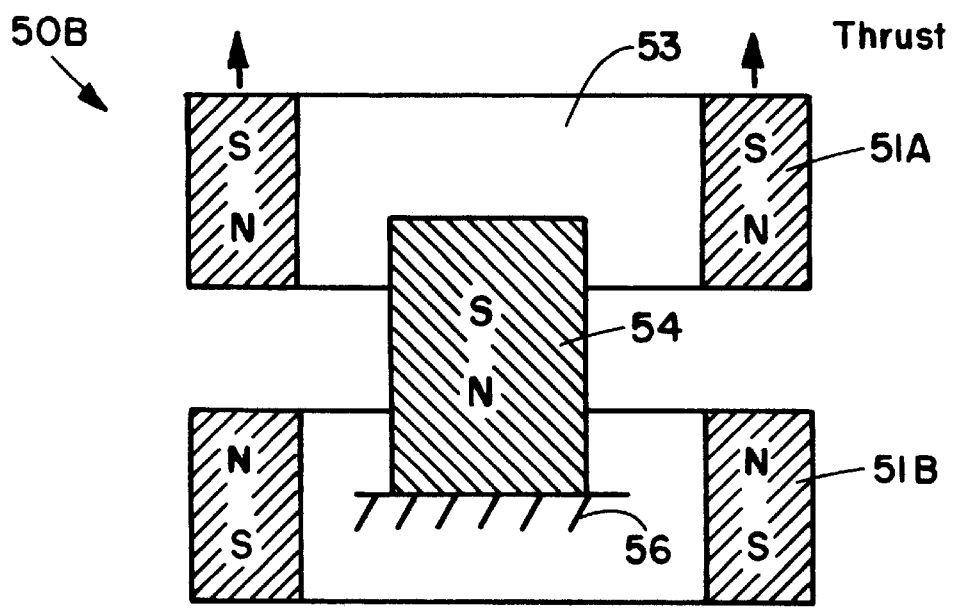
FIG. 4(b) shows a magnetic system 50B, including radial gap features provided by ring magnets 51A and 51B, including cylindrical magnet 54 with the ends of cylindrical magnet 54 positioned partially within hole 53 of each ring magnet 51A and 51B as shown, to provide zero diagonal stiffness, and including anchors 56.

For those rotating objects whose dimensions along the rotation axis are greater than dimensions across and which consequently have a tendency to topple, for example, cigar or elongated-shaped, the designs as shown in FIG. 4(a) or 4(b) can be utilized.

As shown in FIG. 4(a), magnetic system 50A includes radial gap features provided by ring magnet 51 defining hole 53, and cylindrical magnets 54 which are each affixed to an anchor 56, which anchors may be connected or independent. Cylindrical magnets 54 are positioned partially within hole 53 and partially surrounded by ring magnet 51 as shown, to provide zero stiffness. The thrust provided by magnet system 50A is great enough to levitate ring magnet 51 and any structure to which it is connected.

A slight variation of the design of FIG. 4(a) is shown in FIG. 4(b). As shown in FIG. 4(b), magnetic system 50B includes radial gap features provided by ring magnets 51A and 51B, and cylindrical magnet 54 affixed to anchor 56. One end of cylindrical magnet 54 is positioned partially within hole 53 of each ring magnet 51A and 51B as shown, to provide zero stiffness. The thrust of system 50B is great enough to levitate ring magnet 51A and any structure to which it is attached.

It is to be understood that HTS materials could be provided for stability in any number of positions within and/or around magnet systems 51A or 51B, including between any two magnet members and/or beside any magnet members. Suitable methods of providing stability utilizing superconductors is diclosed in U.S. Pat. No. 5,159,219, issued Oct. 27, 1992 to Chu et al., herein incorporated by reference. For example, an HTS sheath could be provided around the ring magnets 54, or an HTS lining could be provided for the interior of ring magnets 51, 51A and/or 51B, within hole 53. Again, either zero-field-cooled or field-cooled superconductors could be utilized.

In the practice of the present invention, cooling of the superonducting materials may be provided by, but not limited to the use of liquid nitrogen or helium. The low temperature required for the superconductors to function are readily accessible with cryocoolers of all sorts. In some cases, the superconductors are used in an environment that is naturally cool enough, such as the lunar surface, or in space. In other cases, the superconductors are used in association with equipment that is already cooled to liquid nitrogen temperatures or below for independent reasons, such as with infrared sensors, or in cryopumps.

The flywheel system of the present invention can be utilzed in a broad range of applications, generally for energy storage/retrieval systems. Specific applications in which the the present invention may be utilized include angular momentum reaction wheels for spacecraft attitude control, flywheels for energy storage in electric vehicles, large flywheels for power utility energy storage, energy storage for pulsed power application in laser devices, and backup power storage flywheels for critical computer systems.

Flywheel systems of the present invention in the small to medium size, that is 1 Whr to 1 kWhr, may be used in uninterruptible power systems, or for power quality control. Medium to large size flywheel system, those in the range of a few kWhr to 10 MWhr can be used for 24 hour period (diurnal cycle) utility load management, and also for extending the capability of renewable generation capacity devices, such as windmills, solar, etc.

The rotational platform embodiment of the present invention may be utilized to mount almost any type of equipment or instrumentation.

EXAMPLES

Example 1

Flywheel

Figure 5:
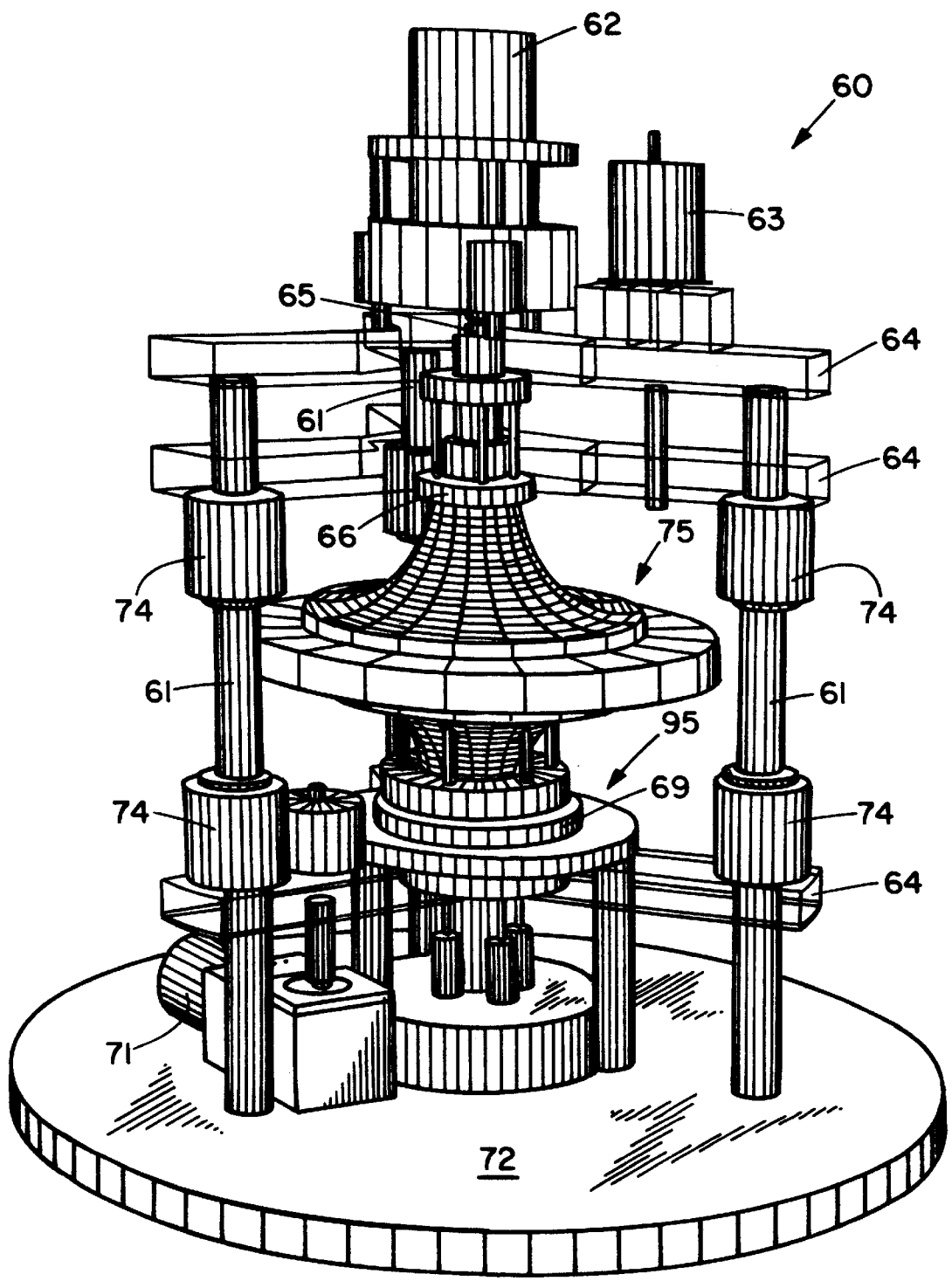
FIG. 5 is a drawing of flywheel system 60 showing flywheel 75, motor 62, stepper motor 63 for the top chamfer, stepper motor 71 for the bottom chamfer, rotor engaging switch 65, HTS cold stage 66, support posts 61, lateral supports 64, linear bearings 74 which allow movement of lateral supports 64 along support posts 61, HTS cold stage 69, cold stage 95, and base support plate 72.
Figure 6:
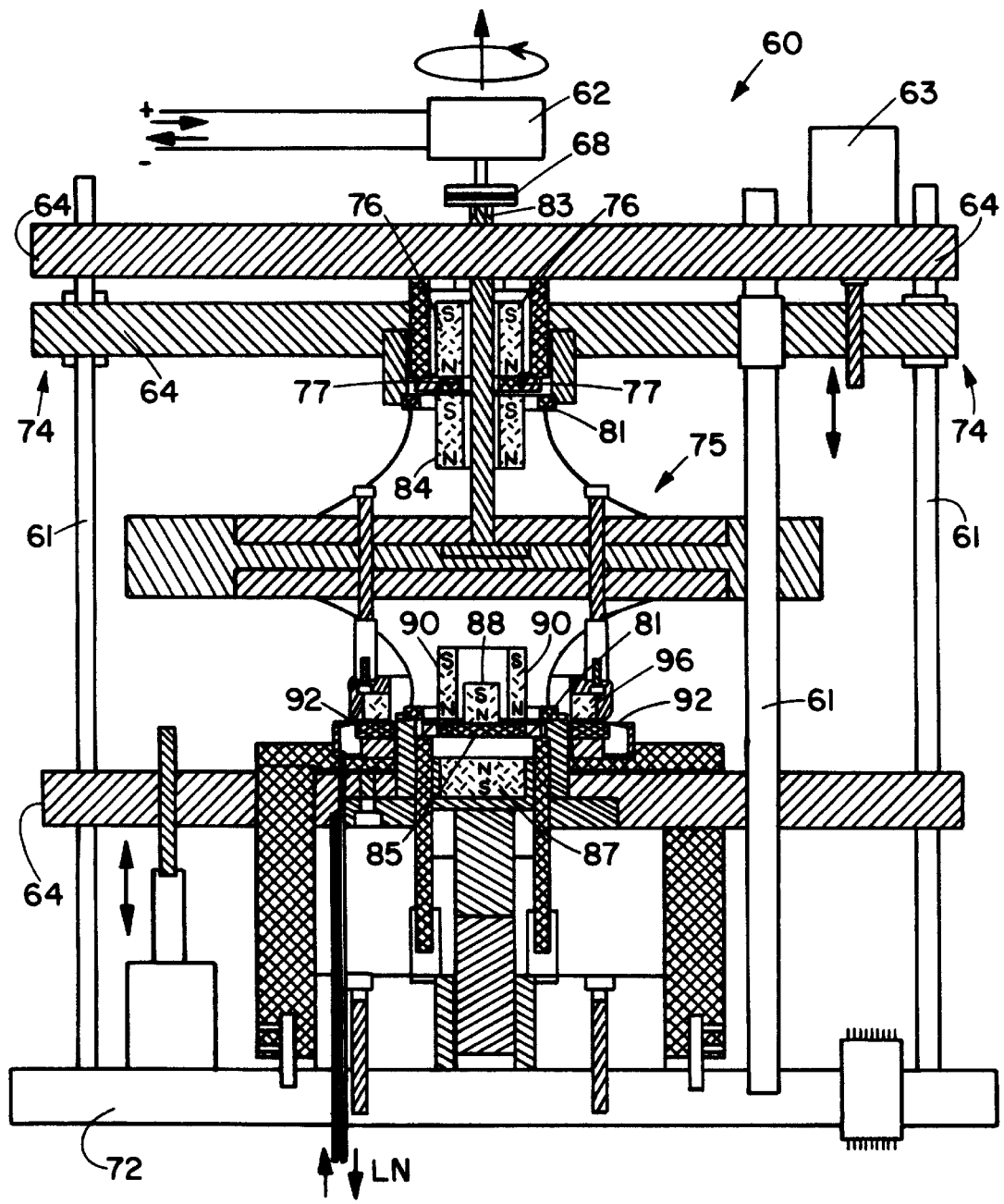
FIG. 6 is a partial cut-away of FIG. 5 showing the various magnets of flywheel system 60, including stator permanent ring magnet 76, stator HTS ring 77 cooled by cold stage 66, rotor permanent ring magnet 84, rotor assembly 75, rotor permanent ring magnet 90, stator permanent disc magnet 88, stator HTS disc 85 cooled by cold stage 69, and stator permanent disc magnet 87, and shown in FIG. 6, a stator ring of HTS discs 92 cooled by cold stage 95, and permanent rotor ring magnet 96.
Figure 7A:
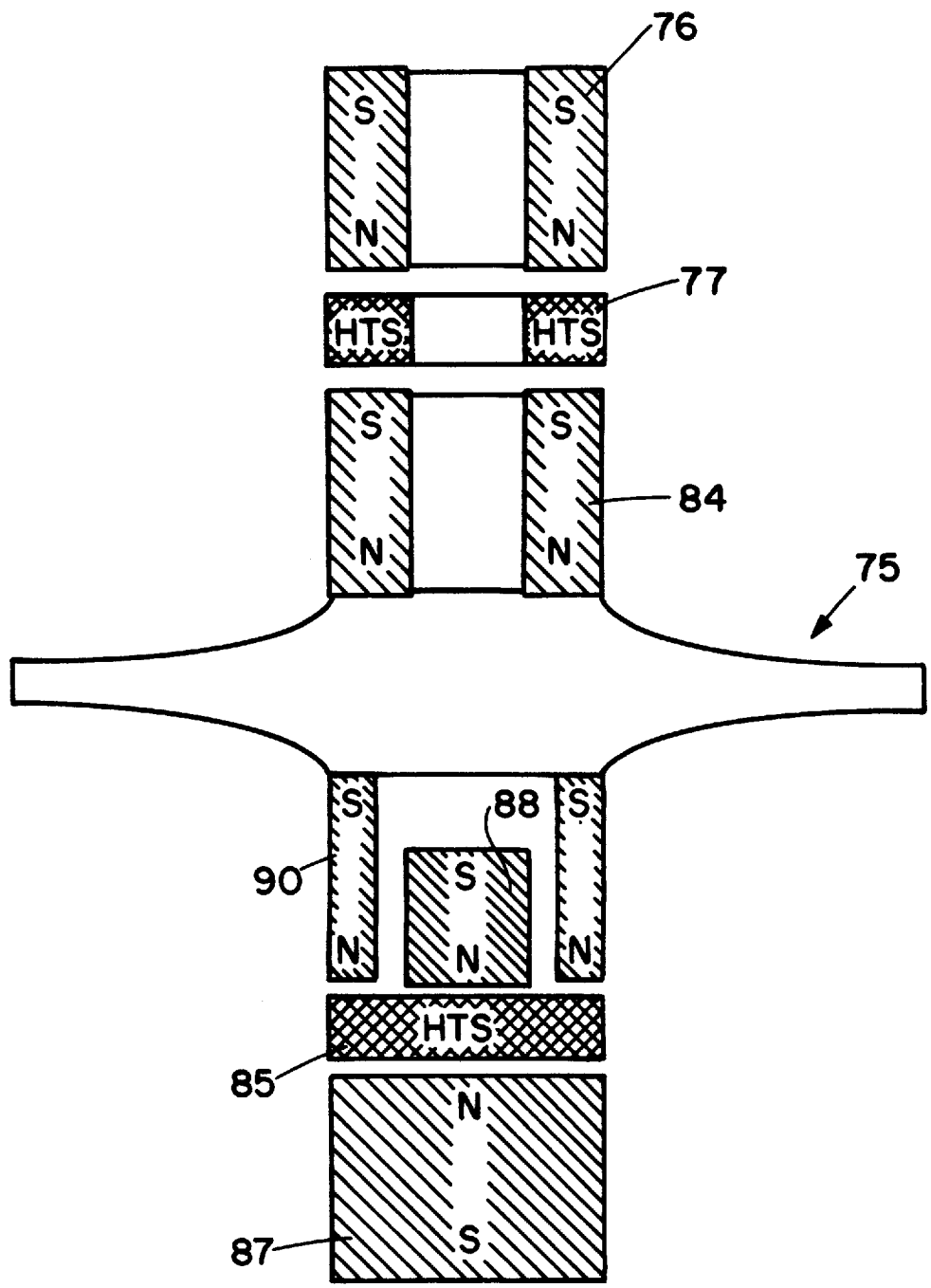
FIG. 7(a) is a schematic showing the various magnets of flywheel system 60, including stator permanent ring magnet 76, stator HTS ring 77 cooled by cold stage 66, rotor permanent ring magnet 84, rotor assembly 75, rotor permanent ring magnet 90, stator permanent disc magnet 88, stator HTS disc 85 cooled by cold stage 69, and stator permanent disc magnet 87.

To demonstrate the viability of the field-cooled hybrid HTS flywheel system, flywheel system 60 as shown in FIGS. 5, 6 and 7(a) was built.

Figure 7B:
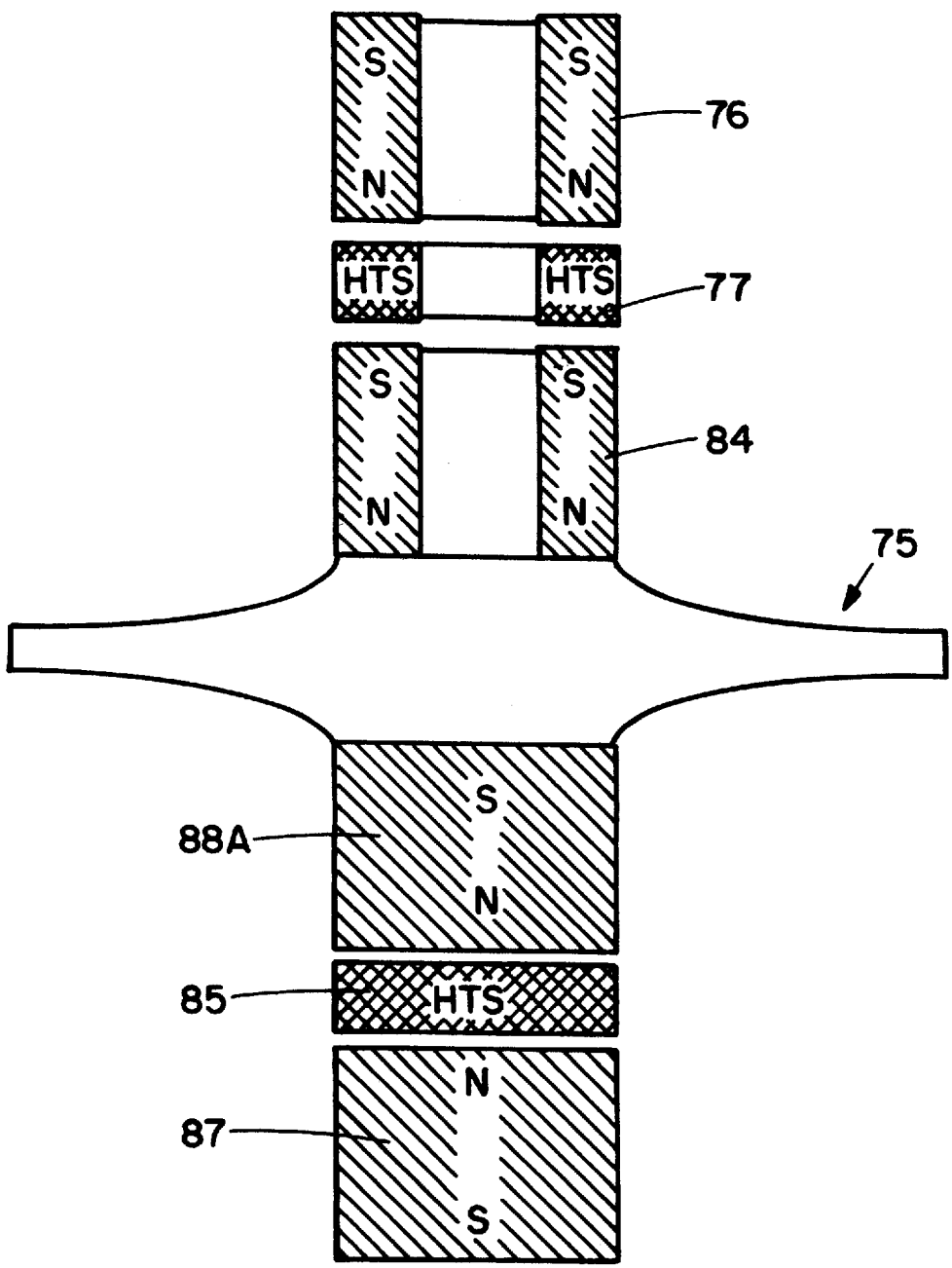
FIG. 7(b) is a schematic of a proposed embodiment in which magnets 88 and 90 as shown in FIG. 7(a) have been replaced with magnet 88A.

FIG. 5 is an isometric drawing of flywheel system 60, FIG. 6 is a partial cut-away of FIG. 5 showing the various magnets included in flywheel system 60, FIG. 7(a) is a schematic showing the various magnets of system 60, and FIG. 7(b) is a schematic of a proposed embodiment in which magnets 88 and 90 have been replaced with magnet 88A.

As shown flywheel system 60 includes flywheel 75, motor 62, stepper motor 63 for the top chamfer, stepper motor 71 for the bottom chamfer, rotor engaging switch 65, HTS cold stage 66, support posts 61, lateral supports 64, linear bearings 74 which allow movement of lateral supports 64 along support posts 61, HTS cold stage 69, cold stage 95, shaft 83, clutch 68, back-up bearings 81 and base support plate 72.

Flywheel system 60 further includes stator permanent ring magnet 76, stator HTS ring 77 cooled by cold stage 66, rotor permanent ring magnet 84, rotor assembly 75, rotor permanent ring magnet 90, stator permanent disc magnet 88, stator HTS disc 85 cooled by cold stage 69, and stator permanent disc magnet 87, and shown in FIG. 6, a stator ring of HTS discs 92 cooled by cold stage 95, and permanent rotor ring magnet 96.

Three cold stages 66, 69 and 95 utilize liquid nitrogen circulated through a closed passage to cool the HTS material. The cold stage 66 near the top of system 60 cools HTS material 77, a ring-shaped YBCO sample (of 1.5 O.D.×0.75 I.D.×0.25 thick) which interacts with the attracting magnets 76 and 84. The cold stage 69 near the bottom of system 60 cools HTS material 85, a 1.5 diameter×0.25 thick disk-shaped YBCO material which interacts with the repelling magnets 90, 88 and 87. The third cold stage, cools disc 92, a disc measuring 6 O.D.×3 I.D. and contains 12 circular pieces of HTS (each 0.75 diameter and 0.75 thick) aligned along the perimeter of a circle of 4 diameter. This array of superconductors 92 interacts with 0.375 thick flywheel ring magnet 96 of 4 O.D.×2.75 I.D. in acquiring excessive lateral stability.

When the HTS samples 77, 85 and 92 are not yet cold enough to be superconducting, the flywheel itself is held in position by a pair of coaxial chamfers (circularly beveled hollow cylinders) clamping the mechanical bearings affixed to both sides of the flywheel. The axial positions of these two chamfers are independently adjustable using remotely controlled stepper motors 63 and 71, without breaking vacuum. These mechanical bearings also serve as a safety backup for the flywheel.

In operation, flywheel system 60 is placed in vacuum, with flywheel 75 clamped and spun up to speed by engaging the motor-generator 62 to the flywheel through an electromagnetic coupling switch 68 placed on the central axis 83. As a desired speed is acquired, motor 62 is disengaged and the chamfers released, leaving the flywheel 75 spinning freely suspended in vacuum. The vacuum level is expected to go down to $10^{-5}$ torr through rough-pumping followed by diffusion pumping the whole system enclosed by a bell jar and a stainless steel base plate. At present, however, only rough pumping has been employed and the vacuum was about $10^{-2}$ torr at which the windage drag was expected to significantly affect the energy storage efficiency.

Thrust and stiffness are two major parameters in assessing bearing performance. The general rule in hybrid HTS bearing design is to make the inherent instability from magnet to magnet interactions weak enough for HTS to compensate. In the flywheel system of this example, the thrusts are by and large equally shared by the top magnets 76 and 84, and by the bottom magnets 87, 88, and 90, as summarized in Table 1, each providing about 21 lb. (9.5 kg) of lifting forces. The top attracting magnets 76 and 84 (magnet 76 stationary and magnet 84 on the flywheel) are ring-shaped with dimensions of 1.5 O.D.×0.626 I.D.×1.125 thick, as detailed in FIG. 7(a). Although the top magnets give a negative axial stiffness of −7.7 N/mm (as attractive magnets tends to crash into each other), the repelling magnets on the bottom slightly alleviate the instability by adding 2.2 N/mm to it, yielding a −5.5 N/mm axial stiffness. While still unstable, the top HTS sample 77 and the bottom HTS sample 85 provide 26–35 N/mm of total axial stiffness (depending on the gap distances between the HTS samples and the flywheel magnets) which results in a net positive stiffness of 20–30 N/mm.

TABLE I

A Summary of Bearing Component Thrust and Stiffness

|  | Top Magnets (76 and 84) | Top HTS (77) | Bottom Magnets (87, 88, 90) | Bottom HTS (85) |
| --- | --- | --- | --- | --- |
| Thrust kg (lb.) | 9.5 (21) | <1 (<2.2) | 9.5 (21) | <1 (<2.2) |
| Axial Stiffness N/mm (lb./in.) | −7.7 (−44) | 10–15 (57–87) | 2.2 (12.5) | 16–20 (90–114) |
| Radial Stiffness N/mm (lb./in.) | 3.8 (22) | 2 (11) | −1 (−5.7) | 6–8 (34–48) |

The bottom repelling magnets included a solid cylindrical magnet 87 (1.5 diameter×1.125 thick) repelling the flywheel magnet 90 (1.5 OD.×1 ID.×1.125 thick) in the axial direction and a smaller pin magnet 88 of 0.65 diameter×0.75 length, which is affixed to the bottom cold stage, repelling the flywheel in radial direction. This magnet 88, besides providing part of the lifting force, reduces the radial instability between the bottom solid magnet 87 and the bottom flywheel magnet 90. The total measured radial instability of the bottom magnet assembly is much smaller than the stiffness provided by the bottom HTS member 85 interacting with the flywheel magnet and thus can be easily counterbalanced, resulting in net radial stability. Radial stability is further enhanced by HTS assembly 92 which includes 12 pieces of ¾×¾ samples interacting with the 4×2.75 ring magnet 96.

Figure 8:
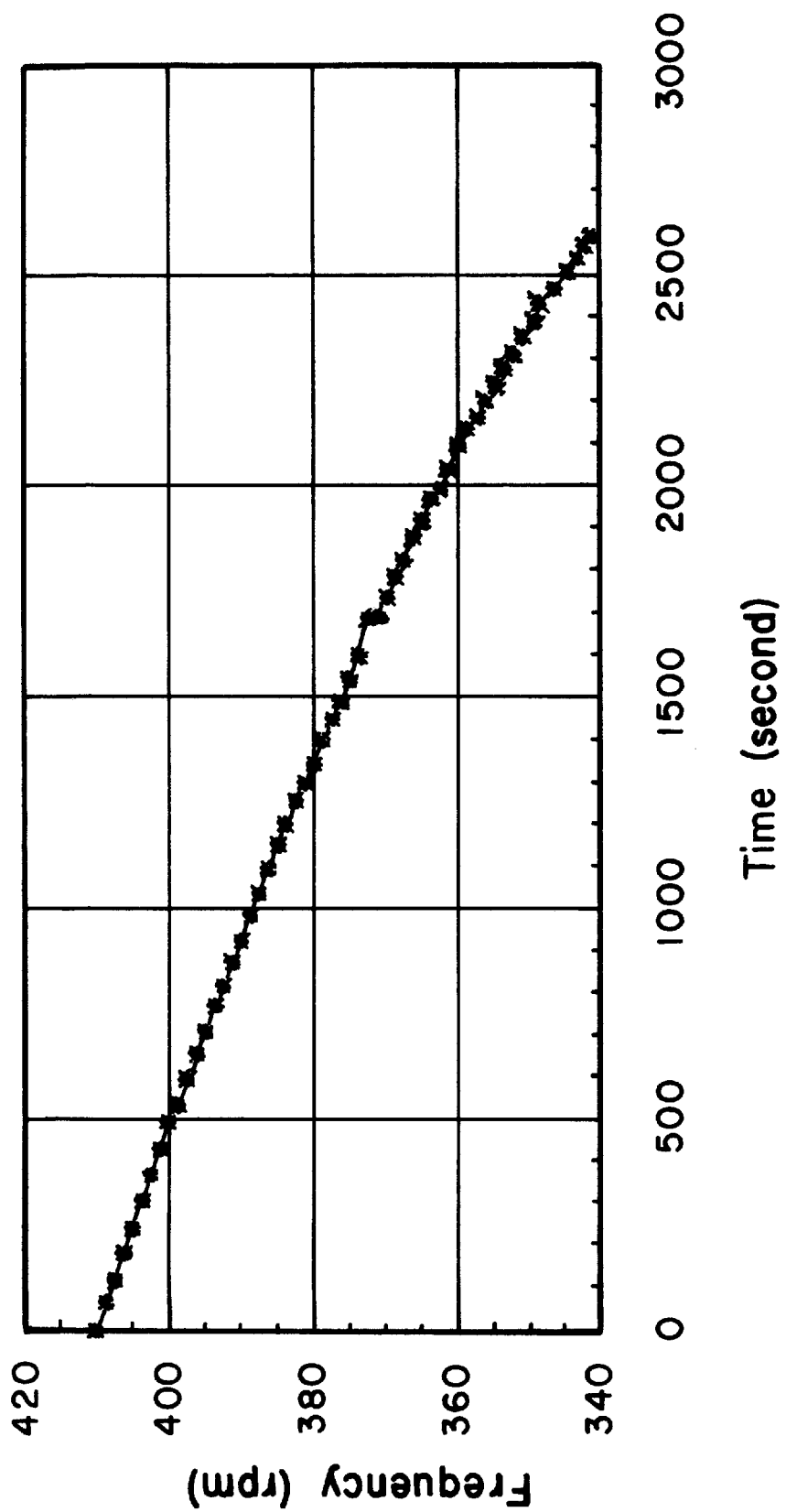
FIG. 8 is a graph showing the spin-down curve for the flywheel system of Example 1, showing spin down from about 430 rpm to about 340 rpm over 2600 seconds at $10^{-2}$ torr vacuum.

In a spin-down test at $10^{-2}$ torr vacuum, the flywheel system was levitated and rotated smoothly up to 410 rpm. After 2600 seconds, the flywheel was operating at 340 rpm, with rpm losses occurring in a generally linear fashion with respect to time, see FIG. 8, Spin down curve. Average energy loss per hour as a percentage of initial kinetic energy stored was about 43 percent. The rotor was observed to whirl during rotation. Therefore, in addition to windage drag, magnetic hysteresis loss, incurred from the flux sweeping in and out of the HTS due to external field variation, was believed to have contributed to a significant fraction of the energy losses. It was later discovered that some of the whirling was caused by a slightly loosened part on the bottom HTS cold stage.

Figure 9:
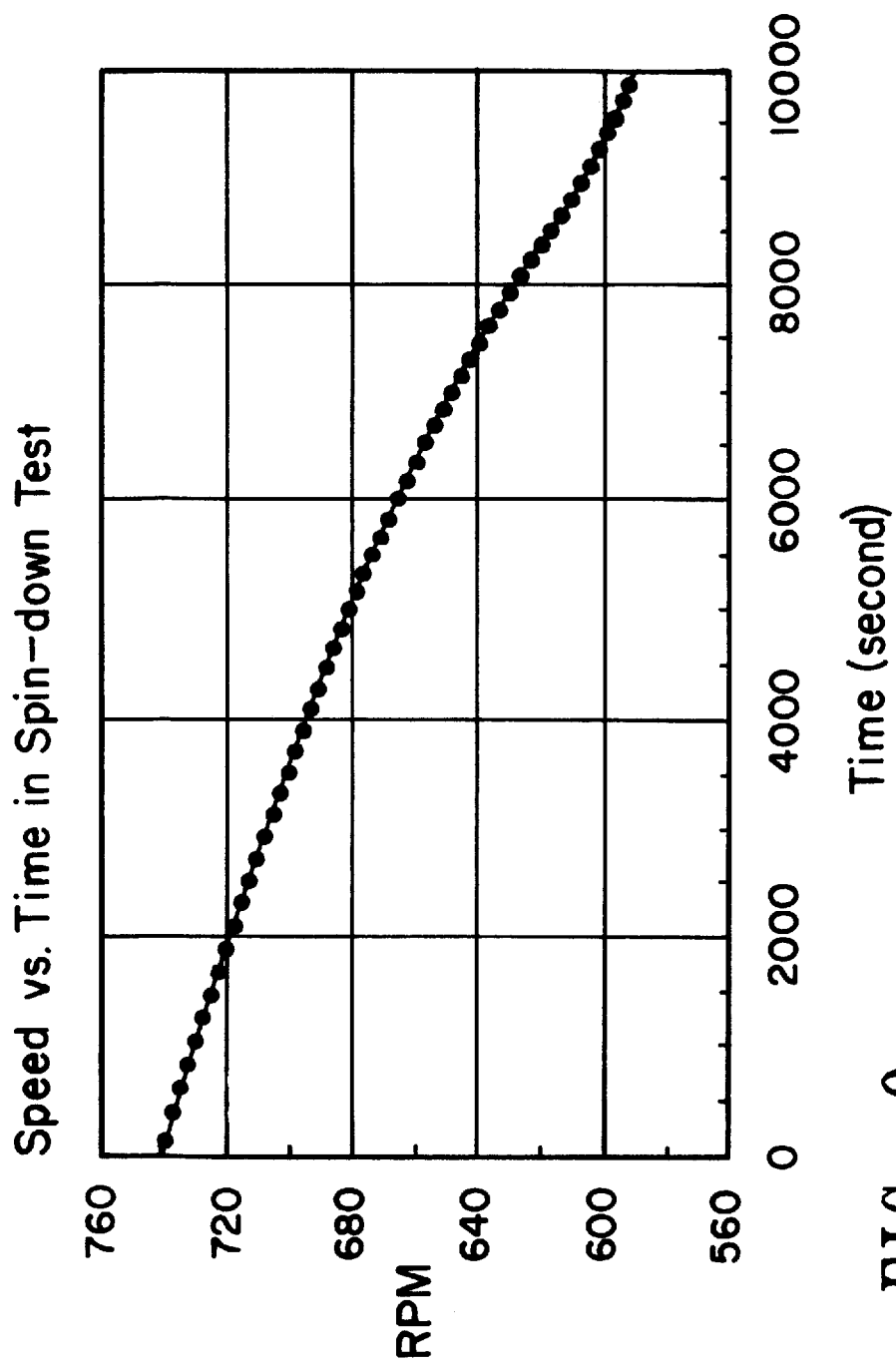
FIG. 9 is a graph showing the spin-down curve for the flywheel system of Example 1, showing spin down from about 740 rpm to about 590 rpm over 9900 seconds at $7 \times 10^{-3}$ torr vacuum.

A second spin-down test was conducted at a much lower vacuum, $7 \times 10^{-3}$ torr. The rotor was levitated and rotated smoothly up to 740 rpm. After 9900 seconds, the rotor was rotating at 590 rpm, with rpm losses occurring in a generally linear fashion with respect to time, see FIG. 9, Spin down curve. Average energy loss per hour as a percentage of initial kinetic energy stored was about 13 percent.

Without being limited to theory, applicants believe that the energy loss in these spin down tests can be traced to (i) aerodynamic drag from the residual gas, present even under 7 mtorr vacuum; (ii) magnetic hysteresis loss coming from the magnets used having slight deviations from perfect axisymmetry; and (iii) eddy current loss for the same reason. Very often, these effects are exacerbated by a minute misalignment of the rotation axis. There is nothing in principle to prevent the reduction of energy loss to as low a level as desired.

In fact, a third spin down test at the same vacuum of $7 \times 10^{-3}$ torr was performed, utilizing a more careful alignment of the magnets with the rotation axis of the flywheel. The rotor was levitated and rotated smoothly up to 2000 rpm. The motor was then disengaged from the flywheel, which rotated for 20 minutes without any noticeable drop in speed. The liquid mitrogen supply was exhausted at the end of this 20 minute run, at which time the experiment was aborted. Energy loss for this 20 minute run was estimated at about 5% per hour.

Example 2

Azimuth Mount of a Lunar Telescope

Figure 10:
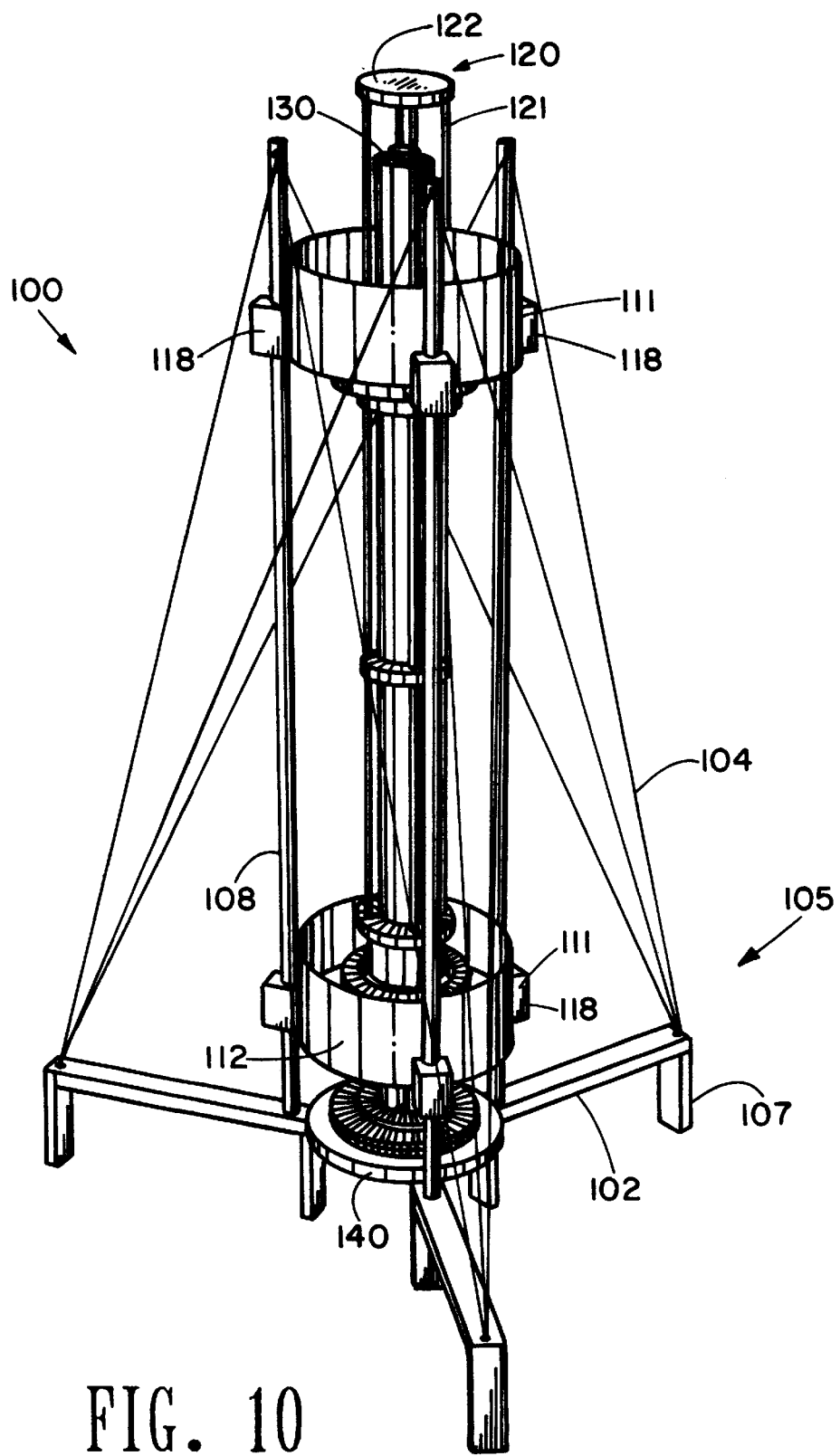
FIG. 10 is a three-dimensional overview of the telescope assembly 100 of Example 2.
Figure 11:
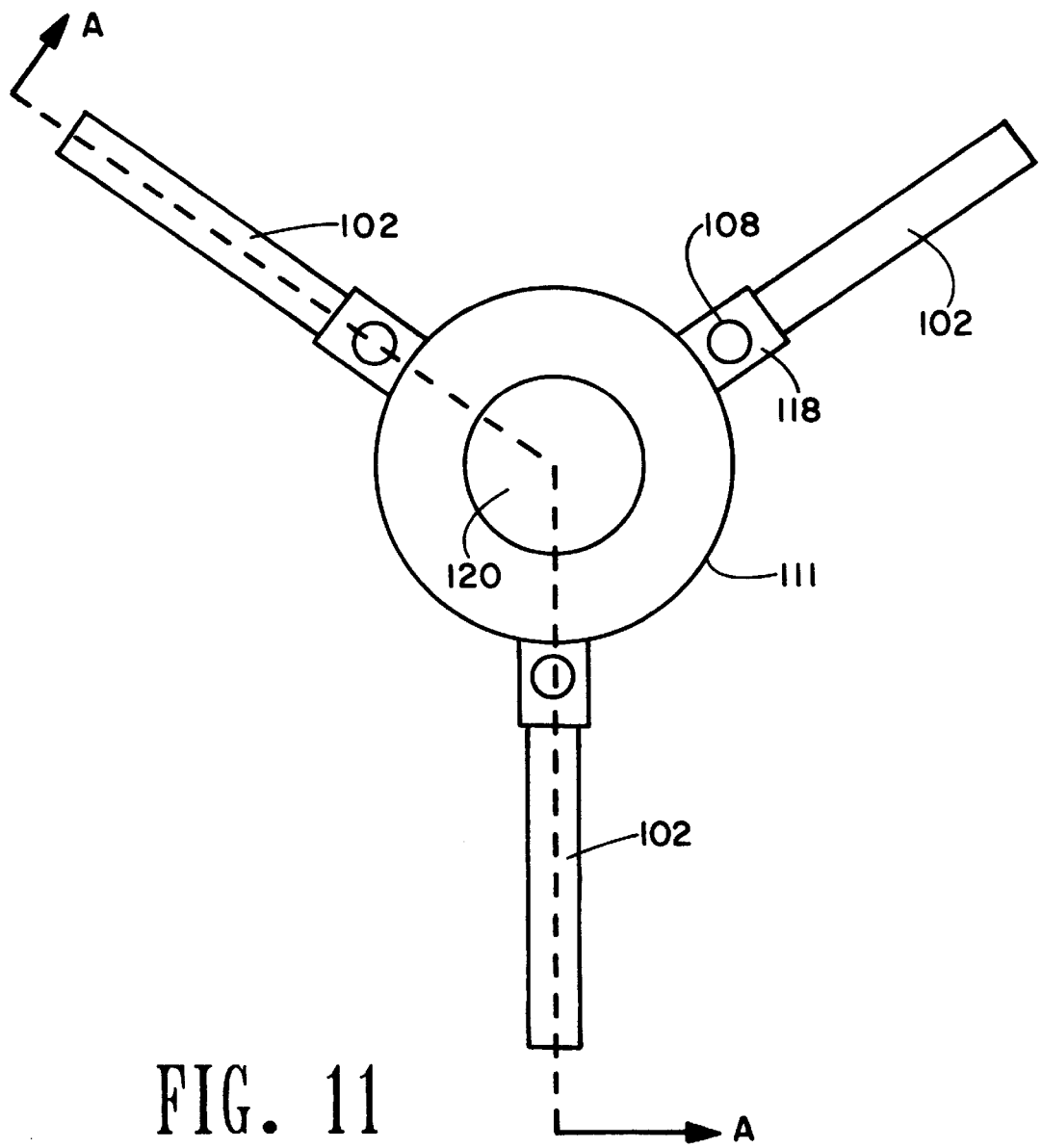
FIG. 11 is a view which shows a top view of assembly 100 of FIG. 10.
Figure 12:
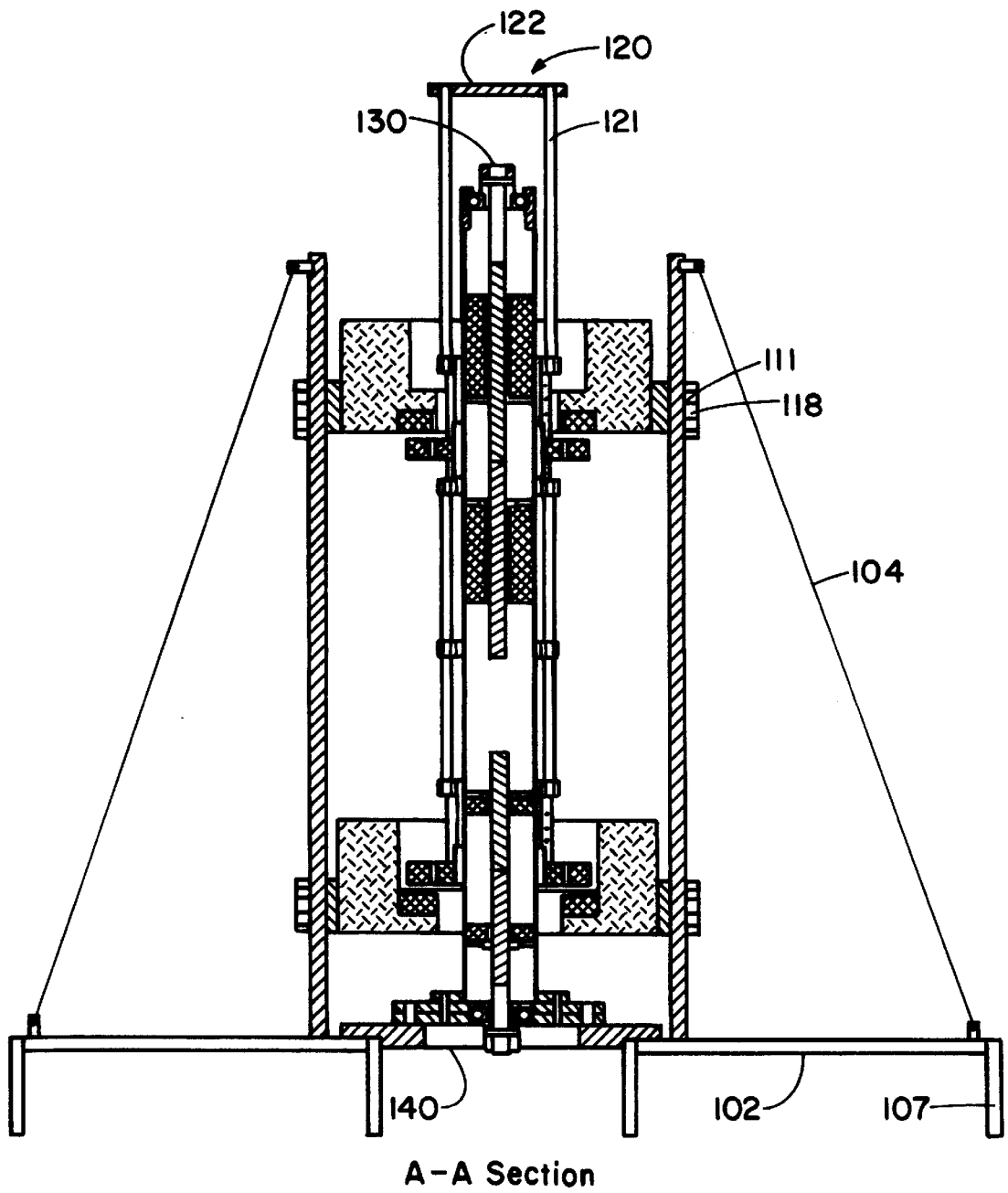
FIG. 12 is a cross-sectional view of assembly 100 at section A—A of FIG. 11.
Figure 13:
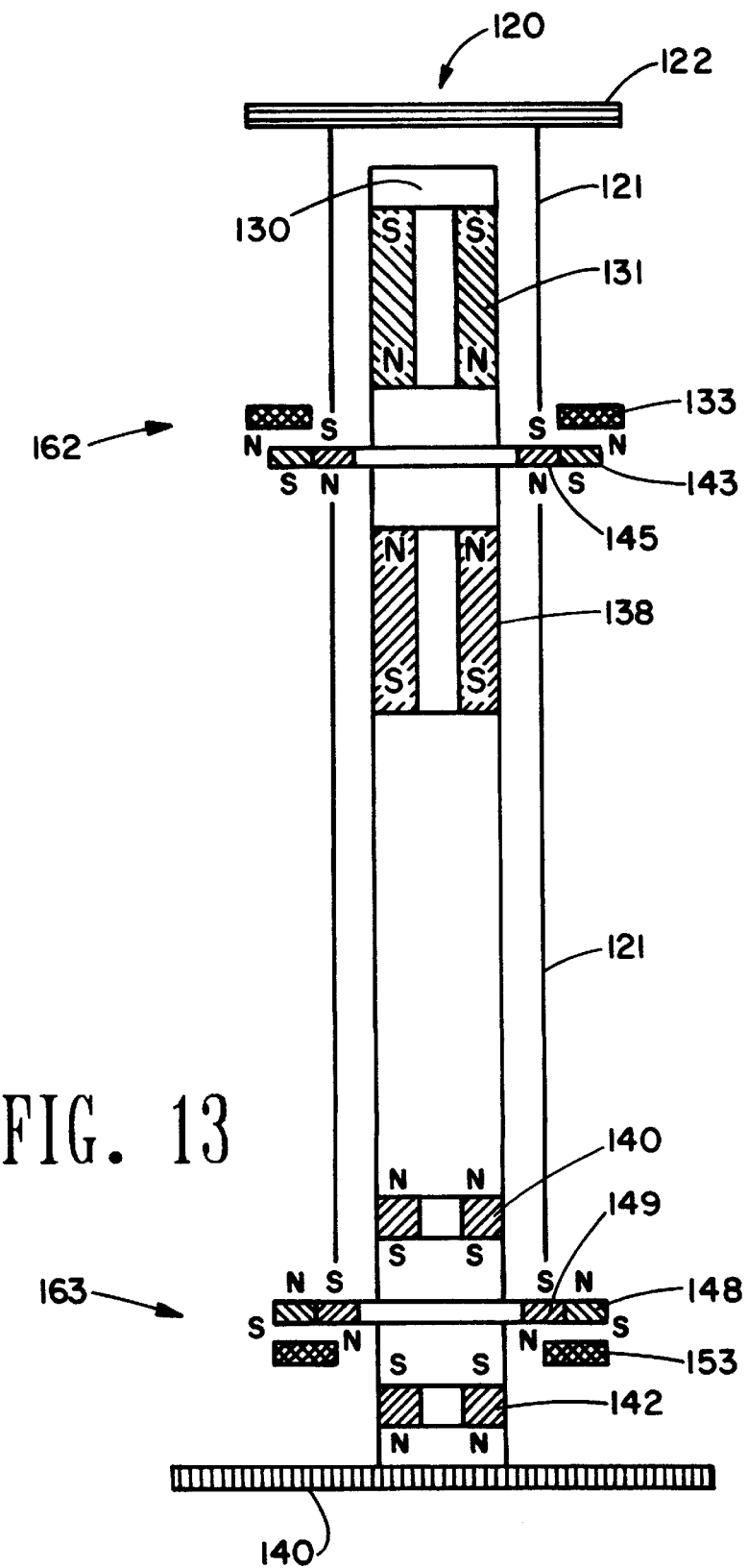
FIG. 13 is a schematic representation of the magnets and HTS materials of assembly 100 shown in FIG. 12.

The bearing on the azimuth mount of a lightweight telescope to be used on the moon need support only a very light load, but stability is still essential. On earth, this is achieved by using counterweights, so that the center of gravity of the telescope assembly falls below the pivotal point of support. This entails additional mass to be added to the telescope assembly, which is undesirable for a telescope to be transported to the moon. This embodiment takes care of this problem by providing an effective counterweight with magnetic forces in the same way that these were utilized to support the weight of the telescope assembly itself. A three-dimensional overview of the telescope assembly 100 is presented in FIG. 10. FIG. 11 shows a top view of assembly 100 of FIG. 10. A cross-sectional view of assembly 100 at section A—A of FIG. 11, is shown in FIG. 12, with a schematic representation of the magnets and HTS materials of assembly 100 shown in FIG. 13.

Assembly 100 includes support base 105 having lateral supports 102, legs 107, vertical supports 108, and support wires 104. Cryogenic systems 111 are secured to vertical supports 108 by brackets 118. Center assembly 130 is secured to base 140. Rotational assembly 120, includes telescope mounting platform 122, and vertical supports 121. In operation, rotational assembly 120 will be levitated above and will rotate around center assembly 130 to orient the telescope (not shown) mounted on mounting platform 122 to the desired orientation.

Bottom magnetic bearing system 163 includes ring magnets 140 and 142, both located on the center assembly 130, and includes ring magnet 149 coupled with ring magnet 148 of opposite polarity both located on rotational assembly 120. Ring magnet is attracted downward toward magnet 142 and away from magnet 140.

Top magnetic bearing system 162 includes magnets 131 and 138, both located on the center assembly 130, and includes ring magnet 145 coupled with opposite polarity ring magnet 143, both located on rotational assembly 120. Ring 145 magnet is attracted upward toward magnet 131 and away from magnet 138. Magnetic bearing system 162 must provide a thrust that is the sum total of the counter weight thrust of system 163 and the actual weight of the telescope assembly. Each of these systems 162 and 163 is designed with neutral stability for the magnets.

The opposite polarities of magnets 148 and 149 of bottom system 163, and of magnets 143 and 145 of top system 162, were designed to strengthen the stability obtainable from the HTSs by maximizing the gradient of the magnetic field that would be frozen into the superconductors. However, the opposite polarity arrangement also implies that the thrust that can be obtained from this volume of magnetic material is just the net of two opposing thrust, and is not the optimal. It can be done in this example, as the weight to be supported is not excessive.

The stator magnets 131, 138, 140 and 142 are cylindrical magnets with a center hole, placed symmetrically above and below the corresponding rotor magnets. The stator magnets 131 and 138 of the top bearing 162 are taller to provide a higher thrust. The distance between the stator magnets in each of these pairs (131 & 138, and 140 & 142, can be adjusted without destroying the symmetry of the positioning with respect to the corresponding rotor magnet. This allows the thrusts provided by bearing systems 162 and 163 to cover a finite range without giving up the condition of neutral stability for the magnets.

In the example model, top bearing system 162 can support an axial load of 45N. It has been used to support a model telescope with a weight of 12N, the equivalent counterweight of 12N from the bottom bearing, the weight of the levitated structure itself making up the remainder. The entire assembly has been observed to rotate continuously under its own inertia for over 45 minutes. The bearing assembly excluding the telescope is about 1 m tall. The top plate is 11.4 cm in diameter, while the base spans 56 cm. The central shaft is slightly less than 7.6 cm in diameter. The levitated structure is held in place with a total stiffness from the bearings of about 10 N/mm in the axial direction. This low stiffness will be supplanted by the stiffness due to feedback control in the complete system. HTS member 133 and 153 are enclosed in two structures 7.6 cm tall and 16.5 cm in diameter, made of Styrofoam and G-10 glass fibre/epoxy composite and fixed separately at 25 cm and 84 cm from the top. With all the necessary fixtures included, the whole bearing assembly weighs 67N.

Figure 14A:
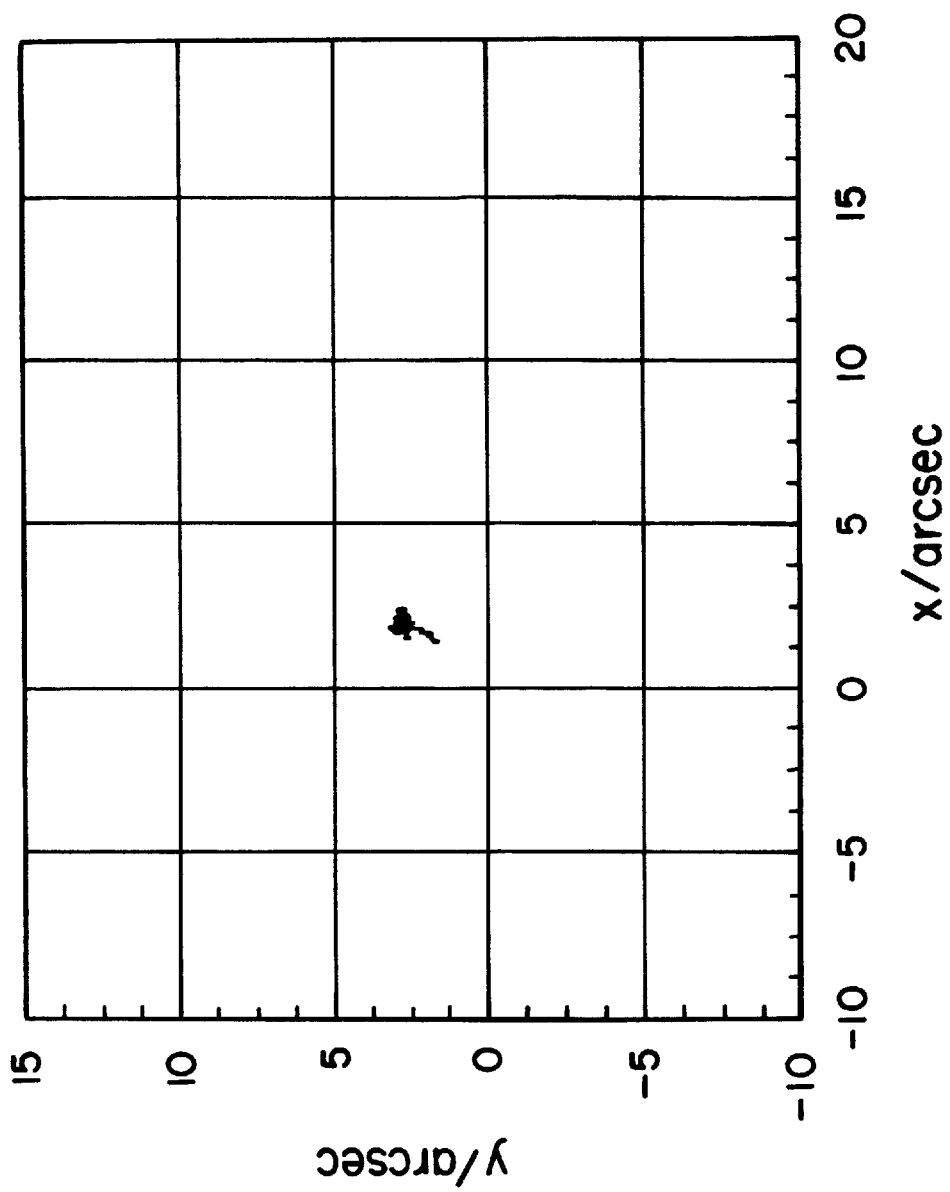
FIGS. 14(a)–14(e) are graphs showing the results of data gathered in Example 2 for a laser mounted on the experimental telescope stand, showing traces of the laser spot on a sensor, for the various time periods of 8 ms, 64 ms, 0.5 s, 8 s, and 32 s.
Figure 14B:
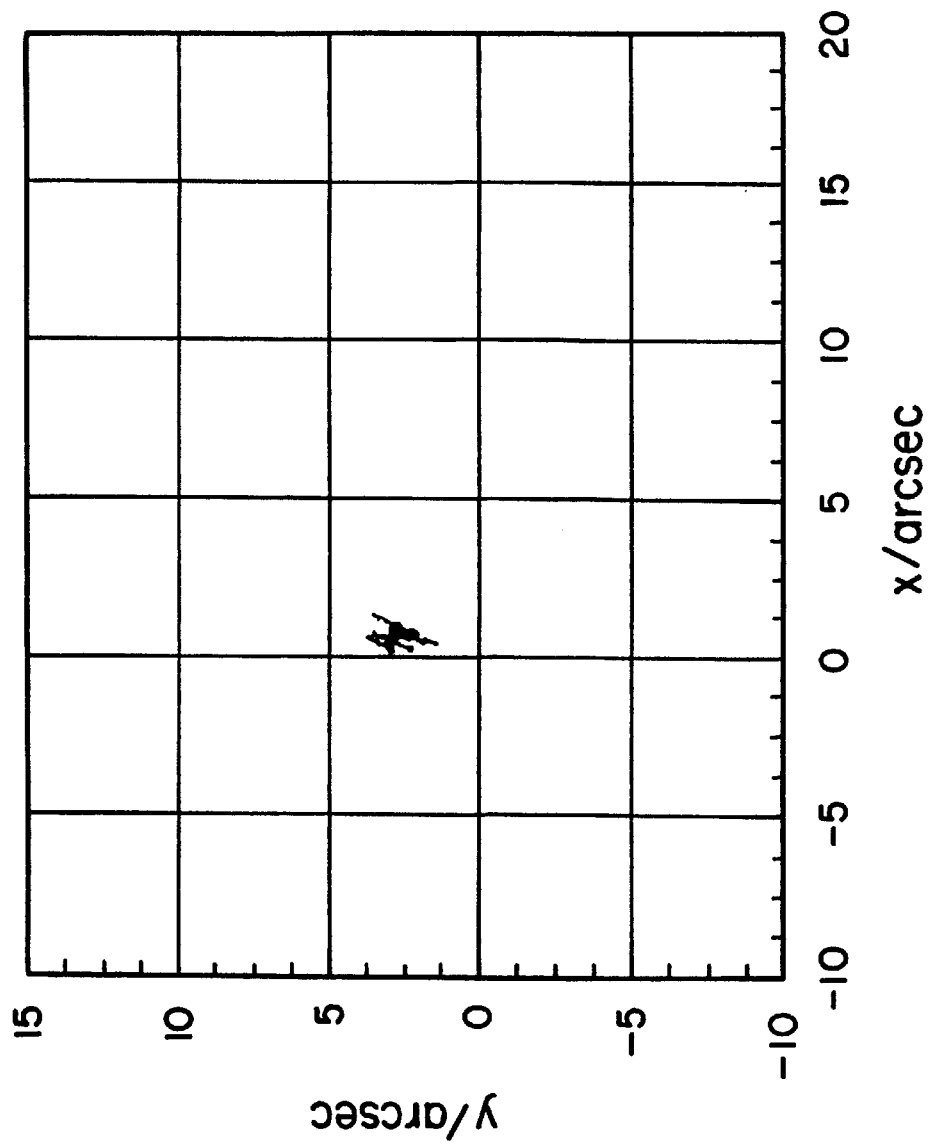
Figure 14C:
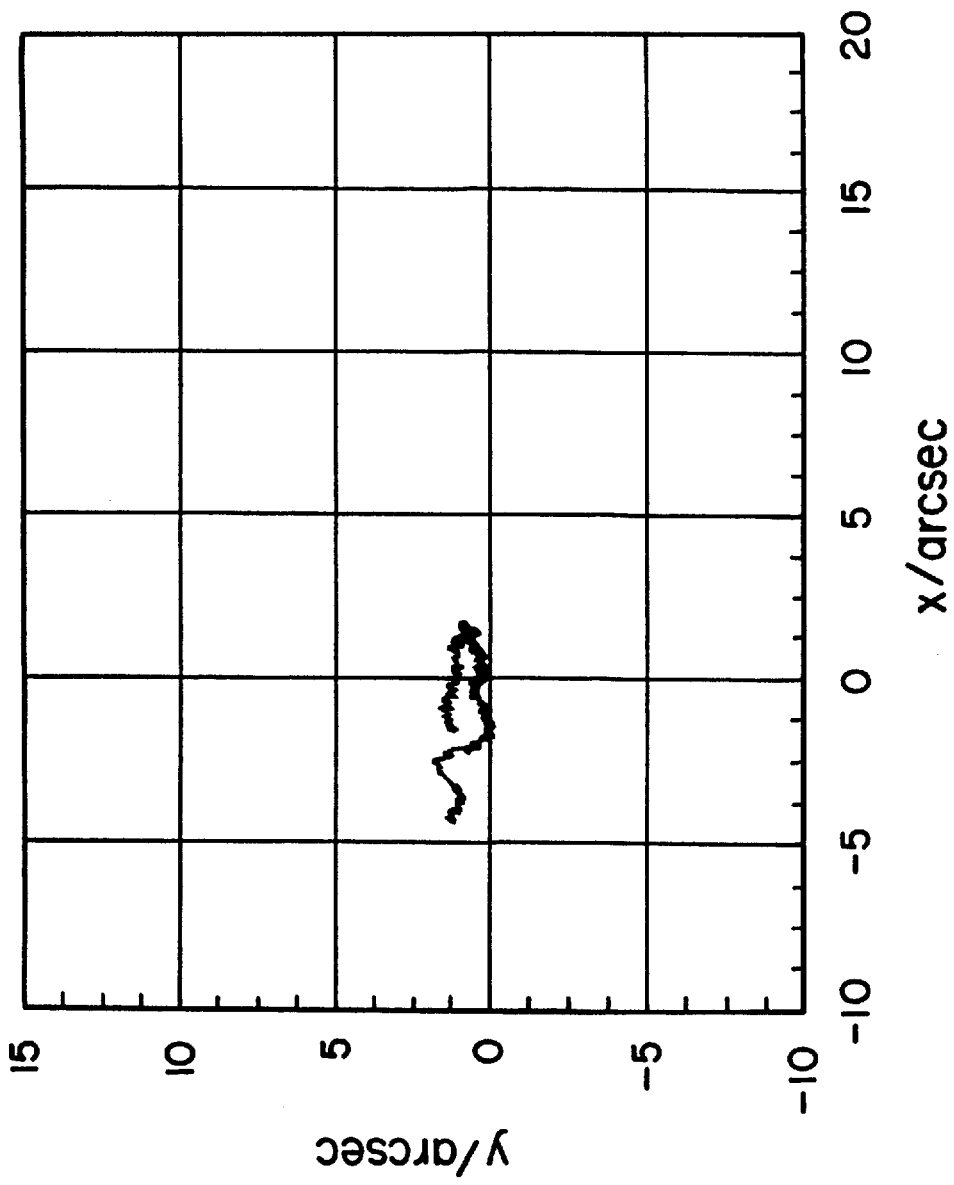
Figure 14D:
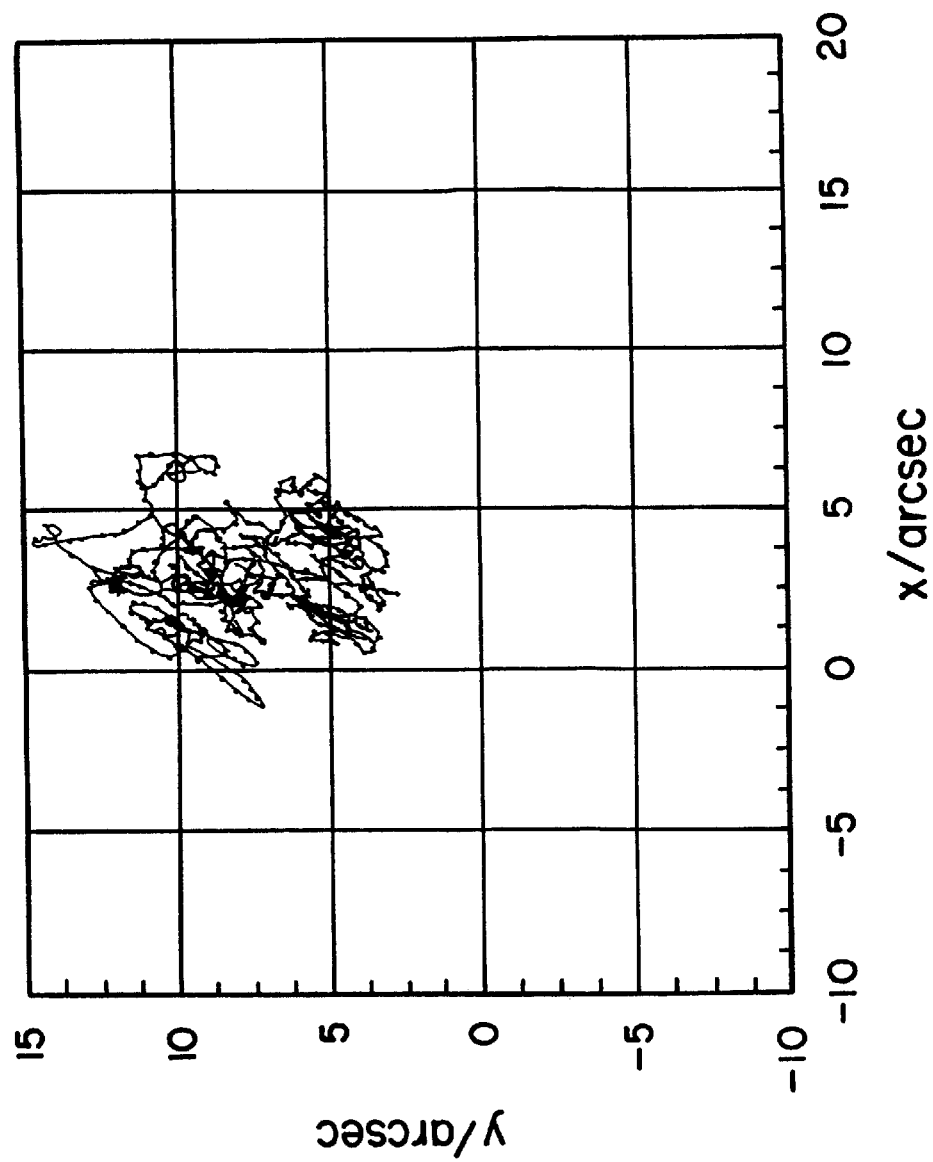
Figure 14:
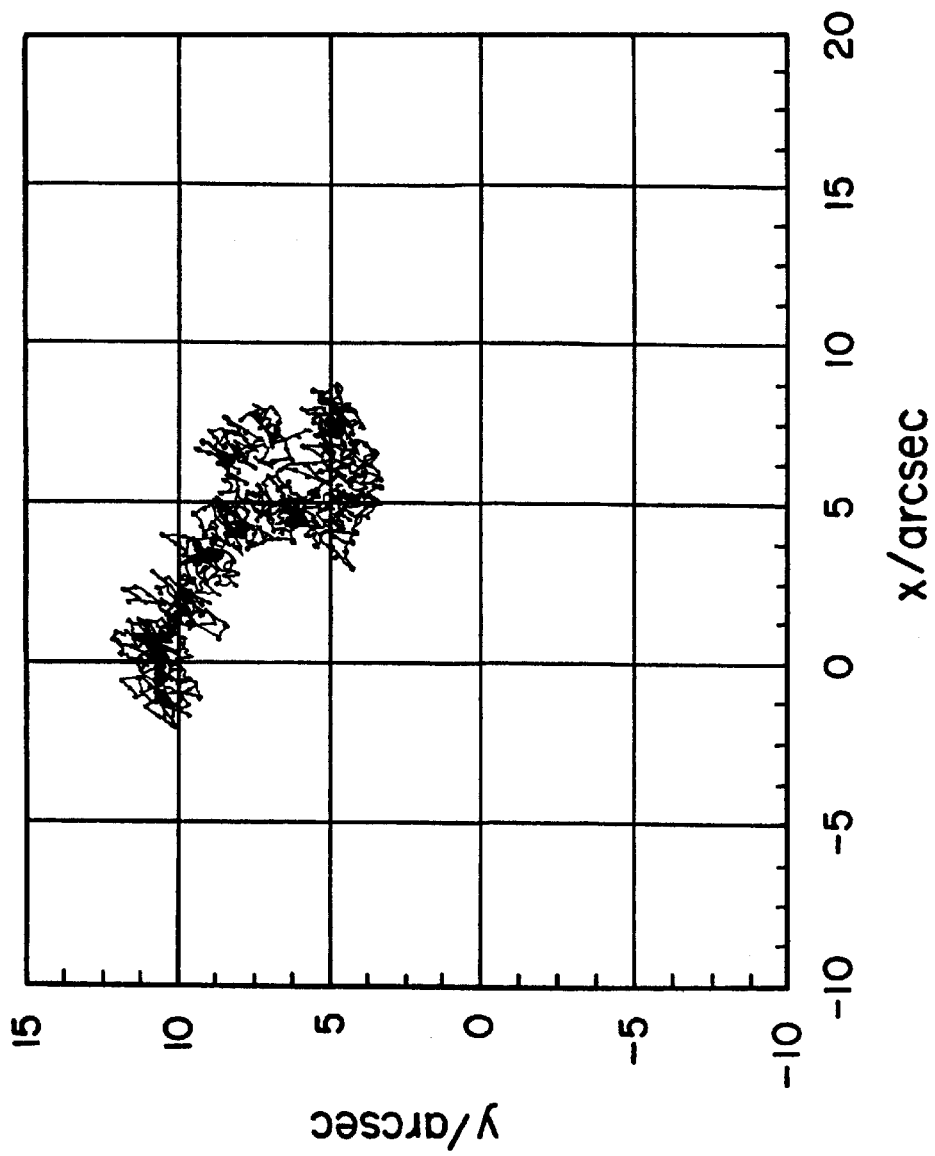

To the astronomer, an important performance parameter is the stability of the bearing. In order to determine this, a mirror was mounted on mount 122 and directed a laser beam to be reflected from the mirror onto an x-y position sensor. The position of the beam on the x-y position sensor was monitored for continuous time periods of different lengths, from 8 ms to 32 s. Traces of the laser spot on the sensor are reproduced in FIGS. 14(*a*)–14(*e*), for the various time periods of 8 ms, 64 ms, 0.5 s, 8 s, and 32 s.

Figure 15:
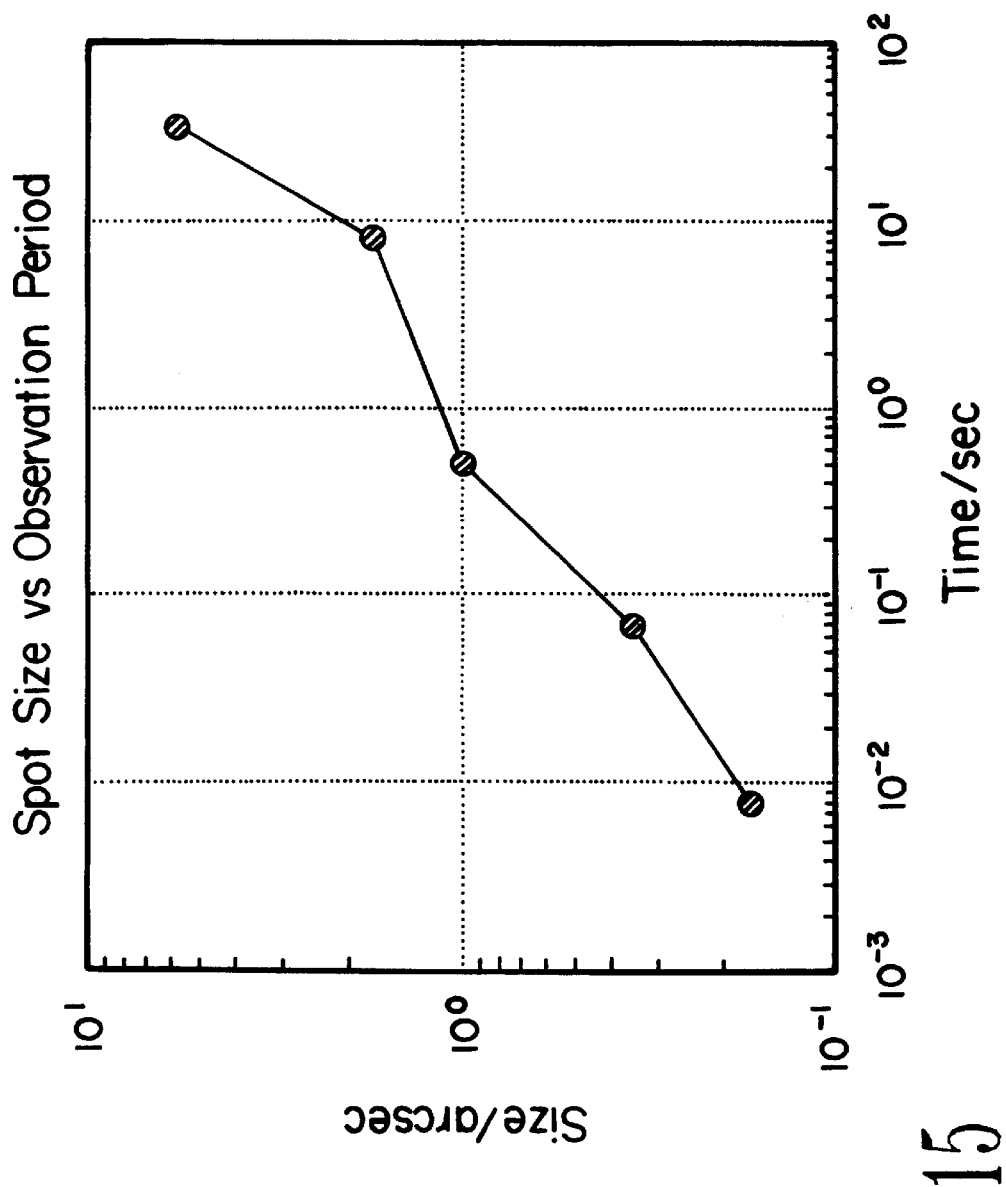
FIG. 15 is a graph of the accumulated spot size, defined by the standard deviation of the angular position from the average over the entire observation period, plotted as a function of the observation period, for the data of FIGS. 14(a)–14(e).

The accumulated spot size, defined by the standard deviation of the angular position from the average over the entire observation period, is plotted as a function of the observation period in FIG. 15. The spot size increases from about 0.97 $\mu$rad of arc at 8 ms of time to around 19.4 $\mu$rad of arc after 32 s of time. For observations from the moon, an accuracy of pointing to 0.48 $\mu$rad of arc is desirable. The angular measures were converted from the position on the x-y position sensor by dividing over the distance (3 m) from the mirror to the x-y position sensor.

It is to be understood that the apparatus of this example may also be used to mount any type of equipment, sensor, measurement device or other apparatus.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

We claim:

1. A rotational platform system comprising:
   a rotatable member having a mounting platform, a first ring magnet coupled with a ring magnet of opposite polarity, a second ring magnet coupled with a ring magnet of opposite polarity, and defining an opening for receiving a magnet support;
   a levitation system for levitating the rotatable member comprising a magnet support positioned within the rotatable member with the rotatable member rotatable about the magnet support;
   a first pair of repulsed magnets supported on the magnet support and positioned so that the first ring magnet is magnetically between the pair and urging the rotatable member upward;
   a second pair of repulsed magnets supported on the magnet support and positioned so that the second ring magnet is magnetically between the pair and urging the rotatable member downward;
   a high temperature superconductor located above the first ring magnet and positioned magnetically between the first pair of repulsed magnets and
   a high temperature superconductor located below the second ring magnet and positioned magnetically between the second pair of repulsed magnets.

2. The platform system of claim 1 wherein the levitation system further comprises one or more legs for anchoring the levitation system to the ground.

3. The platform system of claim 1 further comprising a cooling system for cooling the high temperature superconductors.

4. The platform system of claim 3 wherein the cooling system is a liquid nitrogen cooling system.

5. The platform system of claim 1 wherein the cooling system is a liquid nitrogen cooling system.

6. The platform system of claim 1 further comprising a sensor, measuring equipment or other device affixed to the mounting platform.

7. The platform system of claim 1 further comprising a driving mechanism for rotating the rotatable member.

8. The platform system of claim 7 wherein a telescope is affixed to the mounting platform.

9. The platform system of claim 1 further comprising a sensor, measuring equipment or other device affixed to the mounting platform, further comprising a cooling system for cooling the high temperature superconductors, and further comprising a driving system for rotating the rotatable member, wherein the levitation system further comprises one or more legs for anchoring the levitation system to the ground.

10. The platform system of claim 1 further including a first complementary ring magnet having opposite polarity as and coupled with first ring magnet, and a second complementary ring magnet having opposite polarity as and coupled with second ring magnet.

11. A rotational platform system comprising:
    a rotatable member having a mounting platform, a first ring magnet, a second ring magnet, and defining an opening for receiving a magnet support;
    a levitation system for levitating the rotatable member comprising a magnet support positioned within the rotatable member with the rotatable member rotatable about the magnet support;
    a first pair of repulsed magnets supported on the magnet support and positioned so that the first ring magnet is magnetically between the pair and urging the rotatable member upward;
    a second pair of repulsed magnets supported on the magnet support and positioned so that the second ring magnet is magnetically between the pair and urging the rotatable member downward;
    a high temperature superconductor located above the first ring magnet and positioned magnetically between the first pair of repulsed magnets and
    a high temperature superconductor located below the second ring magnet and positioned magnetically between the second pair of repulsed magnets.

\* \* \* \* \*